United States Patent
Kochi et al.

(10) Patent No.: US 12,307,850 B2
(45) Date of Patent: May 20, 2025

(54) COLLATION SYSTEM

(71) Applicant: NEC Corporation, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

(21) Appl. No.: 18/214,253

(22) Filed: Jun. 26, 2023

(65) Prior Publication Data

US 2023/0334928 A1      Oct. 19, 2023

Related U.S. Application Data

(63) Continuation of application No. 17/683,634, filed on Mar. 1, 2022, now Pat. No. 11,978,295, which is a
(Continued)

(30) Foreign Application Priority Data

Sep. 19, 2017    (JP) ................................. 2017-179064

(51) Int. Cl.
*G07C 9/37*    (2020.01)
*G06V 10/22*    (2022.01)
(Continued)

(52) U.S. Cl.
CPC ............... *G07C 9/37* (2020.01); *G06V 10/22* (2022.01); *G06V 20/52* (2022.01); *G06V 40/165* (2022.01);
(Continued)

(58) Field of Classification Search
CPC . G07C 9/37; G07C 9/10; G06V 10/22; G06V 20/52; G06V 40/165; G06V 40/166;
(Continued)

(56) References Cited

U.S. PATENT DOCUMENTS

| 6,119,096 A | 9/2000 | Mann ........................ G07C 9/37 705/5 |
| 8,339,455 B2 | 12/2012 | Baba ................... G07C 9/00563 348/156 |

(Continued)

FOREIGN PATENT DOCUMENTS

| EP | 1806702 A2 | 7/2007 |
| GB | 2574669 A | 12/2019 |

(Continued)

OTHER PUBLICATIONS

US Office Action for U.S. Appl. No. 17/683,634, mailed on Sep. 21, 2023.
(Continued)

*Primary Examiner* — Wesley J Tucker

(57) ABSTRACT

A collation system of the present invention includes imaging means for acquiring a captured image of a pre-passage side area with respect to each of gates arranged in parallel with each other, and collation means for performing a collation process on the captured image of the pre-passage side area for each of the gates, between a previously registered target and a target included in the captured image. The collation means performs the collation process on the basis of a target in the captured image corresponding to one of the gates and a target in the captured image corresponding to another one of the gates.

8 Claims, 17 Drawing Sheets

Related U.S. Application Data continuation of application No. 16/645,821, filed as application No. PCT/JP2018/029807 on Aug. 8, 2018, now Pat. No. 11,295,116.

(51) Int. Cl.
   *G06V 20/52* (2022.01)
   *G06V 40/16* (2022.01)
   *G07C 9/10* (2020.01)

(52) U.S. Cl.
   CPC .......... *G06V 40/166* (2022.01); *G06V 40/171* (2022.01); *G06V 40/172* (2022.01); *G07C 9/10* (2020.01); *G06V 2201/07* (2022.01)

(58) Field of Classification Search
   CPC . G06V 40/171; G06V 40/172; G06V 2201/07
   See application file for complete search history.

(56) References Cited

U.S. PATENT DOCUMENTS

| | | | |
|---|---|---|---|
| 9,712,738 B2 | 7/2017 | Van Heugten | |
| 10,095,931 B2 | 10/2018 | Tonolke | H04N 7/181 |
| 10,185,965 B2 | 1/2019 | Matsumoto et al. | |
| 10,489,973 B2 | 11/2019 | Reymann | G07C 9/00563 |
| 11,151,481 B1* | 10/2021 | Sun | G06V 40/161 |
| 11,232,295 B2* | 1/2022 | Trelin | G06V 40/16 |
| 11,328,513 B1 | 5/2022 | Osherovich | G06V 10/761 |
| 11,450,186 B2 | 9/2022 | Kamio | G06V 20/52 |
| 11,594,073 B2 | 2/2023 | Yi | G06V 10/82 |
| 11,741,757 B2* | 8/2023 | Ljung | G07C 9/28 340/5.7 |
| 11,869,294 B2* | 1/2024 | Hall | G07C 9/26 |
| 2002/0016740 A1 | 2/2002 | Ogasawara | G06Q 30/0226 705/26.1 |
| 2002/0191817 A1 | 12/2002 | Sato | G07C 9/37 382/118 |
| 2005/0205868 A1 | 9/2005 | Sogo | G07G 9/257 235/382 |
| 2006/0204050 A1 | 9/2006 | Takizawa | G06K 9/00912 382/115 |
| 2007/0031010 A1 | 2/2007 | Sukegawa | |
| 2007/0122011 A1 | 5/2007 | Takizawa | G07C 9/10 382/118 |
| 2007/0189585 A1 | 8/2007 | Sukegawa | G06K 9/00885 382/118 |
| 2007/0242860 A1 | 10/2007 | Hasebe | G06K 9/00255 382/118 |
| 2007/0252001 A1 | 11/2007 | Kail et al. | |
| 2007/0291998 A1 | 12/2007 | Takizawa | G07C 9/37 382/118 |
| 2008/0080748 A1 | 4/2008 | Sukegawa | G06K 9/00885 382/118 |
| 2008/0279427 A1 | 11/2008 | Takagi | H04N 1/62 382/118 |
| 2009/0080715 A1 | 3/2009 | van Beek et al. | |
| 2010/0157062 A1* | 6/2010 | Baba | G07C 9/00563 348/156 |
| 2015/0103178 A1 | 4/2015 | Itoh et al. | |
| 2016/0189063 A1* | 6/2016 | Nie | G06Q 20/322 705/5 |
| 2018/0232569 A1* | 8/2018 | Belkin | G06V 40/70 |
| 2019/0050631 A1* | 2/2019 | Hayase | G06T 7/38 |
| 2019/0057249 A1 | 2/2019 | Hayase et al. | |
| 2021/0081649 A1 | 3/2021 | Kochi et al. | |
| 2021/0110625 A1 | 4/2021 | Nobuaki | G07C 9/257 |
| 2021/0117655 A1 | 4/2021 | Kochi et al. | |
| 2021/0240969 A1 | 8/2021 | Edelen | G06F 16/5854 |
| 2021/0340804 A1 | 11/2021 | Kochi et al. | |
| 2022/0148358 A1 | 5/2022 | Im | G07C 9/32 |
| 2022/0222993 A1 | 7/2022 | Kawase | G07C 9/25 |
| 2022/0335751 A1 | 10/2022 | Hayase | G06F 21/32 |
| 2023/0023000 A1 | 1/2023 | Norimatsu | G07C 9/10 |
| 2023/0076910 A1 | 3/2023 | Kubota | G06V 40/172 |
| 2023/0332457 A1 | 10/2023 | Meiering et al. | |
| 2023/0343160 A1 | 10/2023 | Kochi et al. | |
| 2024/0013597 A1 | 1/2024 | Nam | |
| 2024/0254824 A1 | 8/2024 | Matsunaga et al. | |

FOREIGN PATENT DOCUMENTS

| | | |
|---|---|---|
| JP | 2005-070850 A | 3/2005 |
| JP | 22007-148987 A | 6/2007 |
| JP | 2007-206898 A | 8/2007 |
| JP | 2007-213224 A | 8/2007 |
| JP | 2007-249298 A | 9/2007 |
| JP | 2007-272811 A | 10/2007 |
| JP | 2007-328572 A | 12/2007 |
| JP | 2008-282278 A | 11/2008 |
| JP | 2012-104964 A | 5/2012 |
| JP | 2015-001790 A | 1/2015 |
| WO | 2008/108458 A1 | 9/2008 |

OTHER PUBLICATIONS

International Search Report for PCT Application No. PCT/JP2018/029807, mailed on Nov. 13, 2018.
Japanese Office Action for JP Application No. 2017-179064 mailed on Aug. 28, 2018 with English Translation.
Japanese Office Action for JP Application No. 2018-177488 mailed on Aug. 27, 2019 with English Translation.
Singaporean Office Action for SG Application No. 11202001408P mailed on Aug. 21, 2020.
Extended European Search Report for EP Application No. EP18856639.0 dated on Sep. 7, 2020.
Japanese Office Action for JP Application No. 2020-160455 mailed on Sep. 7, 2021 with English Translation.
US Notice of Allowance for U.S. Appl. No. 18/209,882, mailed on Dec. 19, 2024.
US Office Action for U.S. Appl. No. 18/209,882, mailed on Sep. 5, 2024.
US Office Action for U.S. Appl. No. 18/214,266, mailed on Sep. 5, 2024.
Notice of Allowance for U.S. Appl. No. 18/214,266, mailed on Jan. 6, 2025.
EP Office Action for EP Application No. 18858639.0, dated on Jan. 3, 2025.

* cited by examiner

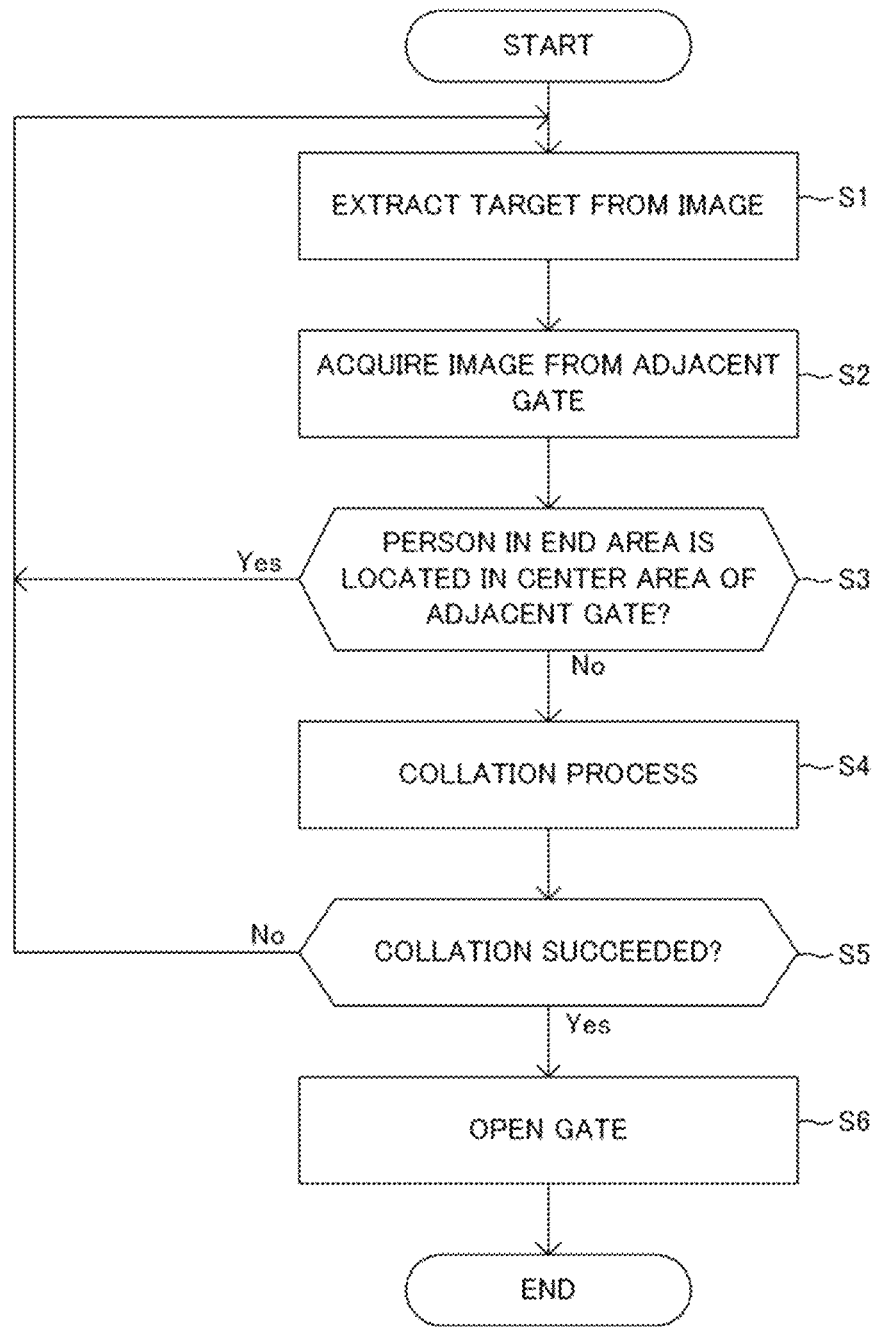

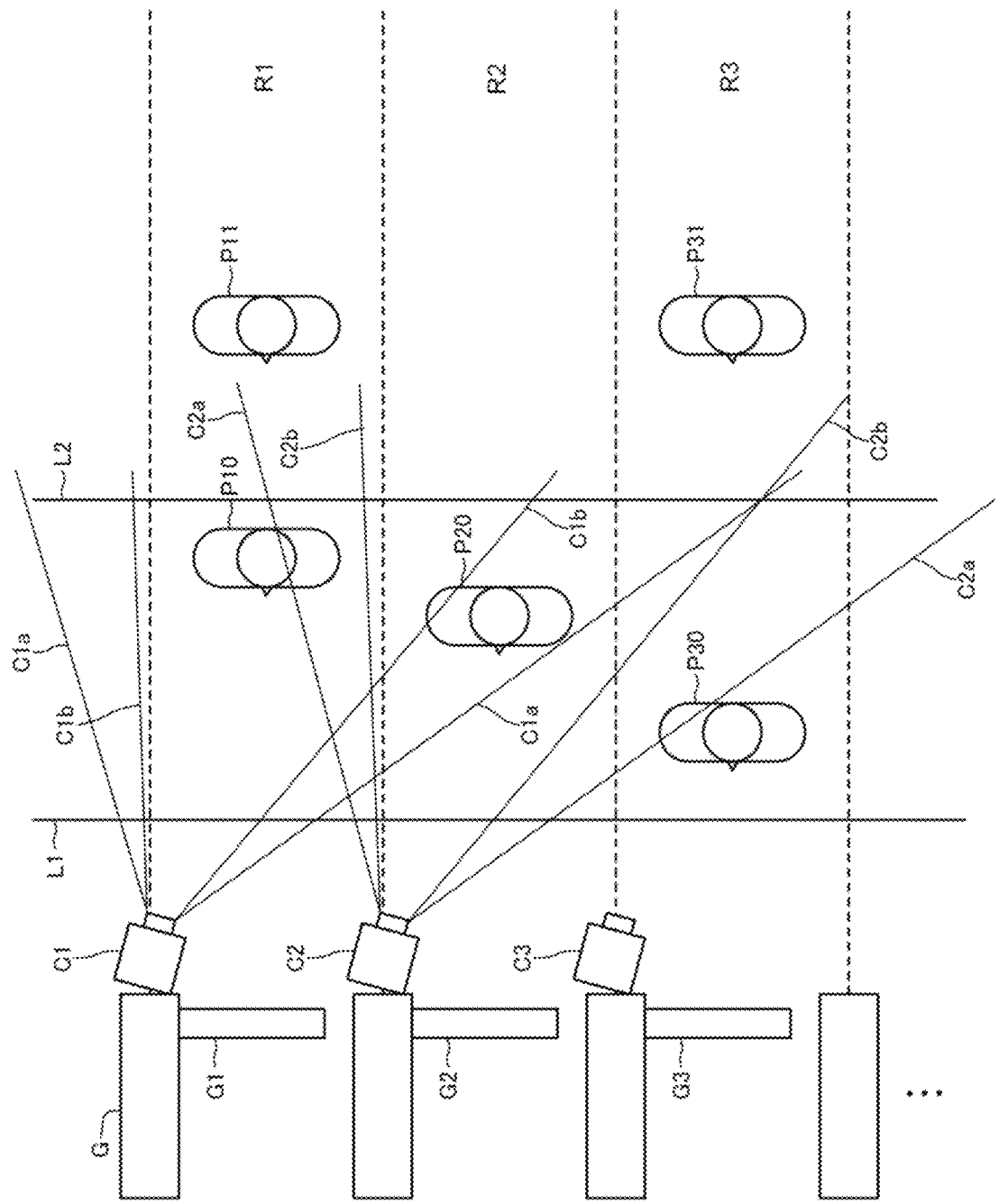

COLLATION SYSTEM

CROSS-REFERENCE TO RELATED APPLICATIONS

The present application is a continuation application of U.S. patent application Ser. No. 17/683,634 filed on Mar. 1, 2022, which is a continuation application of U.S. patent application Ser. No. 16/645,821 filed on Mar. 10, 2020, which issued as U.S. Pat. No. 11,295,116, which is a National Stage Entry of international application PCT/JP2018/029807, filed on Aug. 8, 2018, which claims the benefit of priority from Japanese Patent Application 2017-179064 filed on Sep. 19, 2017, the disclosures of all of which are incorporated in their entirety by reference herein.

TECHNICAL FIELD

The present invention relates to a collation system, and in particular, to a collation system for performing collation on a target that is about to pass through a gate.

BACKGROUND ART

As a means for limiting or managing persons who enter or leave a specific location such as an office or an event site, a collation system is used to perform collation on a person who is about to pass through to check whether or not the person is a previously registered person. In particular, since a human face authentication technique has been developed recently, a walkthrough face authentication system has been used to perform face authentication from a face image of a person captured by a camera installed at a gate.

Patent Literature 1: JP 2015-1790 A

SUMMARY

In a walkthrough face authentication system, there is a case where a plurality of gates are installed adjacently, and lanes on which persons move toward the respective gates are provided adjacently. In that case, in an image in which persons moving on a lane of a gate are captured, there is a case where a person moving on the adjacent lane toward the adjacent gate is also shown. Therefore, the person moving on the adjacent lane may be erroneously recognized as a person moving on the own lane, which may hinder collation of a person passing through the own gate provided ahead of the own lane. Therefore, in a situation where a plurality of gates are installed, erroneous recognition of a person moving toward each gate should be suppressed.

Further, as art related to the walkthrough face authentication system, art described in Patent Literature 1 has been known. Patent Literature 1 presents a problem that authentication is completed when a person is located away from the gate and the gate is opened before the person reaches the gate. In order to solve such a problem, in Patent Literature 1, collation is performed between the captured face image of a person and a registered face image, and based on the size of the collated person on the input image, approaching to the gate of the person is detected. In addition, in Patent Literature 1, it is attempted to prevent erroneous recognition of a person moving toward an adjacent gate by setting different determination reference values for the size of a face area, for the respective areas of a captured image.

However, the art described in Patent Literature 1 only uses a captured image by a camera installed corresponding to a gate that a person is about to pass through, and approaching to the own gate by a person is detected with use of a determination reference value for the size of a person set to each area of the capture image. This still causes a problem that when the area of a person shown in a captured image is not appropriate or the determination reference value is not appropriate, a person moving toward another gate is erroneously recognized.

Further, a problem of erroneous recognition of persons moving toward the gates may be caused in the case where collation is performed on any target, without being limited to the case where a target that is about to pass through the gate is a person.

Therefore, an object of the present invention is to provide a collation system capable of solving the problem described above, that is, a problem of erroneous recognition of a target that is about to pass through a gate.

A collation system, according to one aspect of the present invention, includes
   an imaging means for acquiring a captured image of a pre-passage side area with respect to each of gates arranged in parallel with each other, and
   a collation means for performing a collation process on the captured image of the pre-passage side area for each of the gates, between a previously registered target and a target included in the captured image.
The collation means is configured to perform the collation process on the basis of a target in the captured image corresponding to one of the gates and a target in the captured image corresponding to another one of the gates.

Further, an information processing apparatus, according to one aspect of the present invention, includes
   a collation means for performing a collation process on a captured image of a pre-passage side area with respect to each of gates installed in parallel with each other, between a previously registered target and a target in the captured image.
The collation means is configured to perform the collation process on the basis of a target in the captured image corresponding to one of the gates and a target in the captured image corresponding to another one of the gates.

Further, a program, according to one aspect of the present invention, is a program for causing an information processing apparatus to realize
   a collation means for performing a collation process on a captured image of a pre-passage side area with respect to each of gates installed in parallel with each other, between a previously registered target and a target in the captured image.
The collation means is configured to perform the collation process on the basis of a target in the captured image corresponding to one of the gates and a target in the captured image corresponding to another one of the gates.

Further, a collation method, according to one aspect of the present invention, is a method including performing a collation process on a captured image of a pre-passage side area with respect to each of gates installed in parallel with each other, between a previously registered target and a target in the captured image.

The collation process is performed on the basis of a target in the captured image corresponding to one of the gates and a target in the captured image corresponding to another one of the gates.

As the present invention is configured as described above, erroneous recognition of a target that is about to pass through a gate can be suppressed.

BRIEF DESCRIPTION OF DRAWINGS

FIG. 7 is a flowchart illustrating a processing operation by the face authentication system disclosed in FIG. 1.

FIG. 8 illustrates an imaging state by a face authentication system according to a second exemplary embodiment of the present invention.

EXEMPLARY EMBODIMENTS

First Exemplary Embodiment

Figure 1:
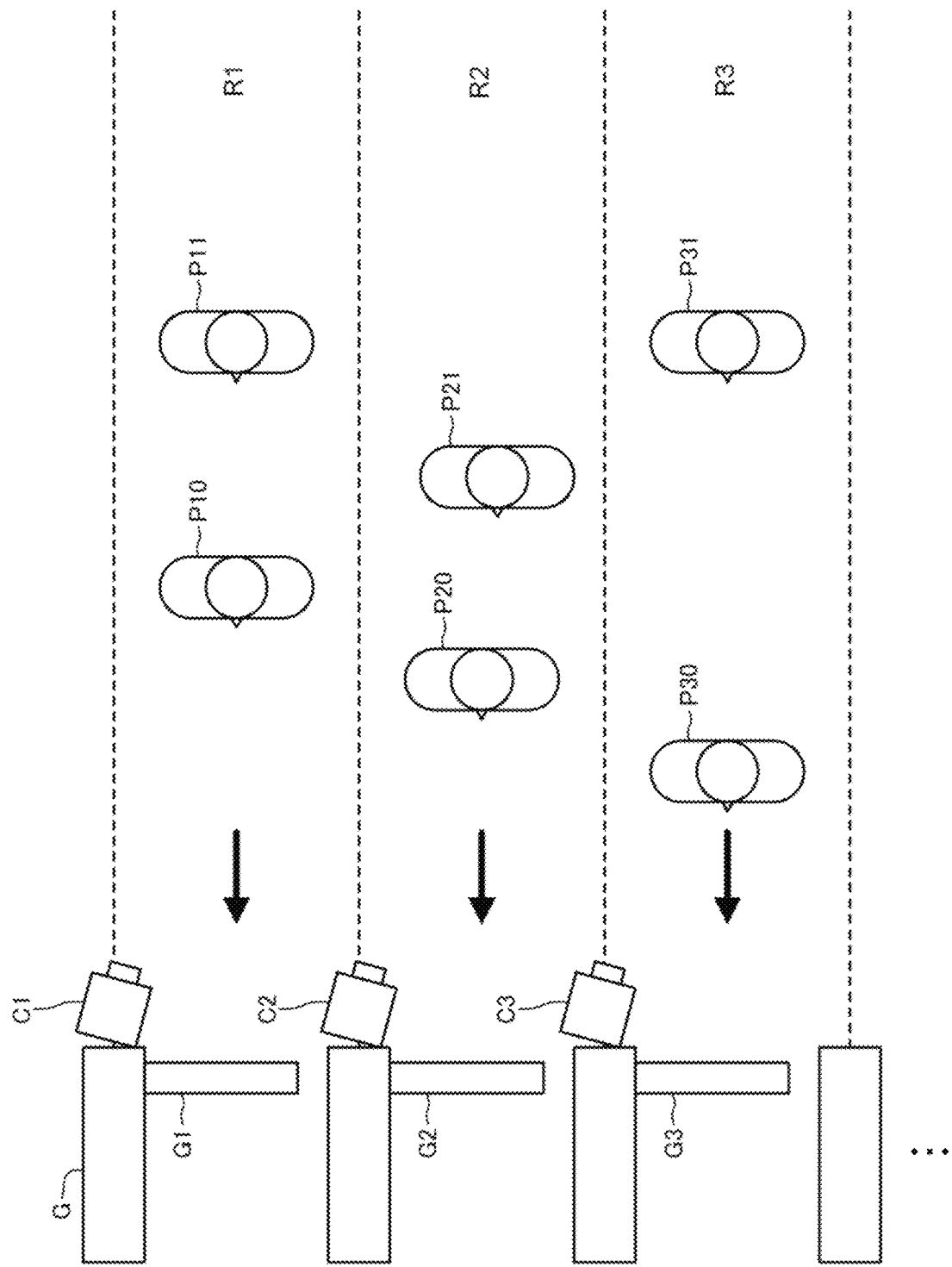
FIG. 1 illustrates a used state of a face authentication system according to a first exemplary embodiment of the present invention.
Figure 2:
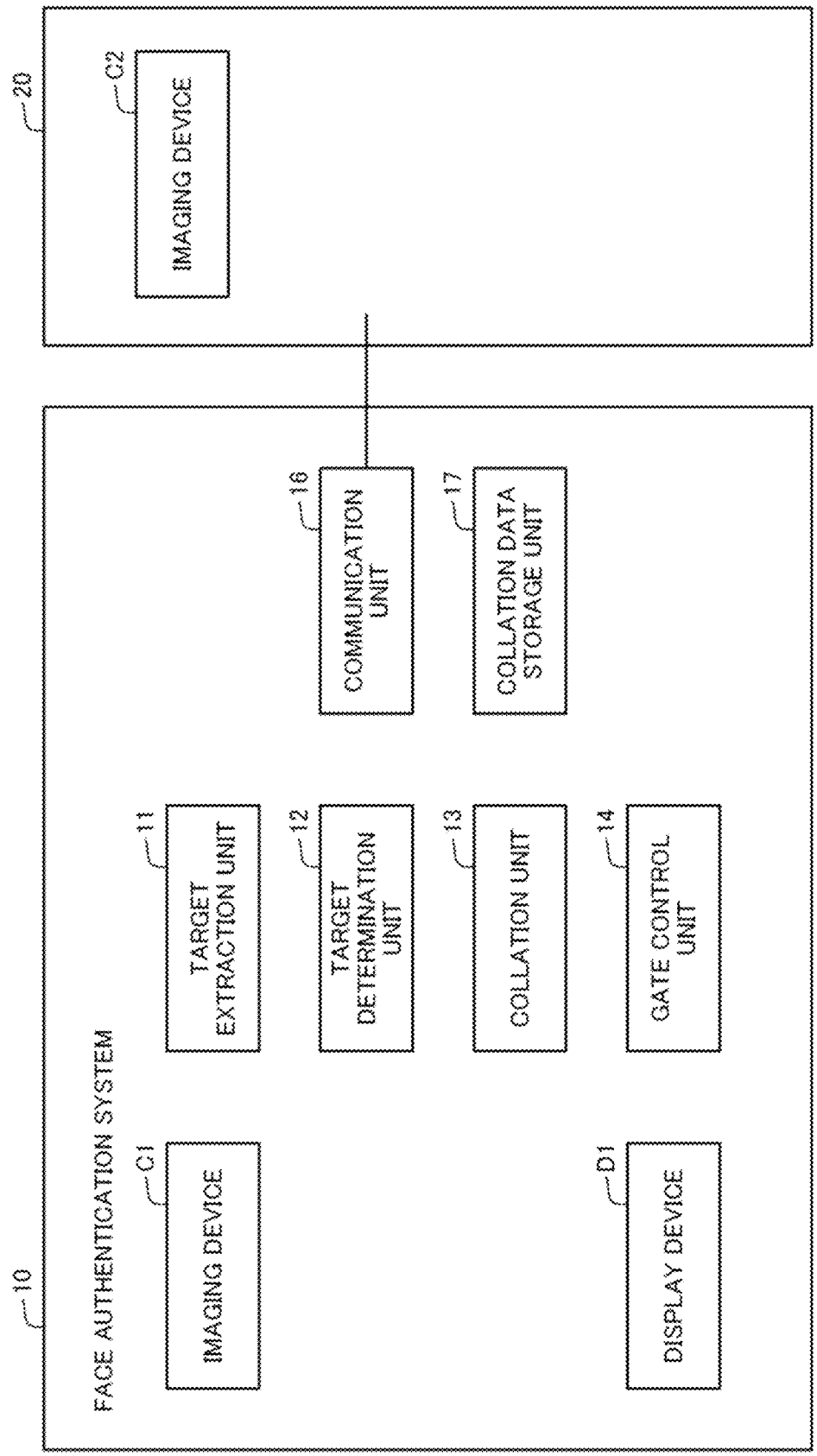
FIG. 2 is a block diagram illustrating a configuration of the face authentication system according to the first exemplary embodiment of the present invention.

A first exemplary embodiment of the present invention will be described with reference to FIGS. 1 to 7. FIG. 1 illustrates a used state of a face authentication system. FIG. 2 illustrates a configuration of a face authentication system. FIGS. 3 to 7 are diagrams for explaining processing operation of the face authentication system.

[Overall Configuration]

A face authentication system 10 (collation system) of the present invention is a system to be used for limiting and managing entrance/exit of persons (targets) at a specific location such as an office or an event site. For example, an imaging device constituting the face authentication system 10 is installed for each gate that is opened and closed when a person enters or leaves, in the vicinity of the installed location of the gate.

In the example illustrated in FIG. 1, three gates G1, G2, and G3 are adjacently arranged in parallel with each other, and are configured such that persons go through in a direction shown by arrows from the right side in FIG. 1 toward the respective gates G1, G2, and G3. Therefore, the right side area in FIG. 1 with respect to each of the gates G1, G2, and G3 is an area before a person passes through the gate (pre-passage side area). In the pre-passage side areas of the respective gates G1, G2, and G3, lanes R1, R2, and R3, on which persons who are about to pass through the gates G1, G2, and G3 move in lines, are located in parallel with each other corresponding to the gates G1, G2, and G3, respectively. Note that the respective lanes R1, R2, and R3 may or may not be partitioned with some members.

In the state illustrated in FIG. 1, imaging devices C1, C2, and C3 constituting the face authentication system 10 in the present embodiment are installed in the vicinity of the corresponding gates G1, G2, and G3, respectively, on the right side thereof as viewed from the persons moving toward the respective gates G1, G2, and G3. However, the installation positions of the imaging devices are not limited to the positions as illustrated in FIG. 1. They may be installed at any positions such as a left side as viewed toward the gates or above the gates. Note that the face authentication system 10 also has display devices in the vicinity of the imaging devices C1, C2, and C3.

In the face authentication system 10, at the gate G1, for example, an image of a person moving toward the gate G1 is captured by the installed imaging device C1. Then, from a face image of the person shown in the captured image, collation is performed to check whether or not the person is a previously registered person. When the collation succeeded, a process of opening the gate G1 is performed so as to allow the person to pass through. Note that to the other gates G2 and G3, face authentication systems and the imaging devices C2 and C3 are also installed respectively, and collation is performed on persons moving toward the respective gates G2 and G3. The configuration of the face authentication system 10 will be described in detail below. Note that while description will be mainly given below on the face authentication system 10 provided corresponding to the gate G1, a face authentication system provided corresponding to another gate G2 or G3 has the same configuration.

[Configuration of Face Authentication System]

The face authentication system 10 of the present embodiment is an information processing apparatus including an arithmetic unit and a storage unit integrally formed with the imaging device C1 (camera) and a display device D1 (display). Put another way, an information processing apparatus having an arithmetic unit that performs face authentication processing and a storage unit, and the display device D1 are mounted on the imaging device C1. However, the face authentication system 10 is not necessarily limited to that integrally formed with the imaging device C1 and the display device D1. For example, the imaging device C1, the display device D1, and the information processing apparatus that processes captured images may be different devices and installed at different locations.

Specifically, as illustrated in FIG. 2, the face authentication system 10 includes the imaging device C1 and the display device D1, and a communication unit 16, and also includes a target extraction unit 11 constructed by execution of a program by the arithmetic unit, a target determination unit 12, a collation unit 13, and a gate control unit 14. The face authentication system 10 also includes a collation data storage unit 17 that are constructed in the storage unit.

Figure 3:
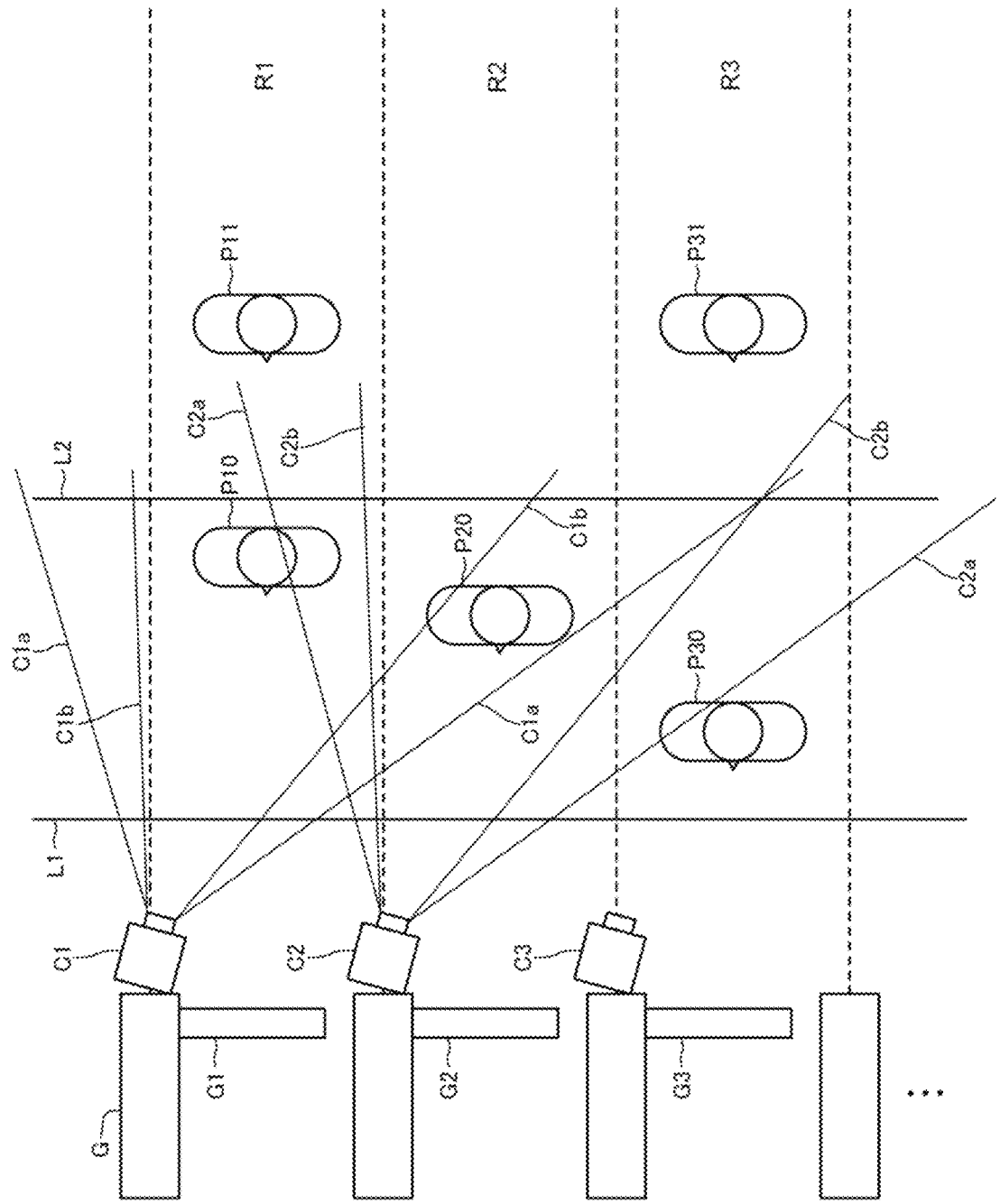
FIG. 3 is illustrates an imaging state by the face authentication system disclosed in FIG. 1.

The imaging device C1 (imaging means) is provided with a camera for acquiring a captured image of a pre-passage side area with respect to the gate G1, that is, an area in front of the gate G1 of the corresponding lane R1, at a predetermined frame rate, and a camera control unit. As illustrated in FIG. 3, the capturing area of the imaging device C1 is a range between lines C1a, for example. Here, the capturing area of the imaging device C1 is set such that a person P10, moving on the lane R1 (own lane) corresponding to the gate G1 at which the imaging device C1 is installed, is located in a center area in the horizontal direction between lines C1b of the capturing area. Note that the captured image is set to be roughly focused in a range of a preset distance in the approaching direction with respect to the imaging device C1, that is, a distance from a line L1 to a line L2 illustrated in FIG. 3, for example.

Since the capturing area of the imaging device C1 is set as described above, in an end area in the horizontal direction relative to the center area, that is, in an area between the line C1a and the line C1b of the capturing area, a person P20 moving on the lane R2 corresponding to the adjacent gate G2 may be shown, in the state illustrated in FIG. 3. Further, in the state illustrated in FIG. 5, a person P12 located on the own lane R1, corresponding to the own gate G1 at which the imaging device C1 is installed, may be shown in an end area. Even if such a state is caused, the face authentication system 10 of the present invention is configured to exclude the person P20 who is about to pass through the adjacent gate G2 from the collation process target, and appropriately recognize the person P12 who is about to pass through the own gate G1, to thereby enable determination of propriety of gate passage.

The target extraction unit 11 acquires a captured image from the imaging device C1, and extracts a person who is a processing target from the captured image. Extraction of a person is performed by, for example, extracting a moving object, or performing determination from the position of a characteristic shape part or the position of a color with respect to the overall shape or overall image. At that time, the target extraction unit 11 also identifies an area in the captured image where the extracted person is located. In particular, in the present embodiment, it is identified whether the extracted person is located in a center area or left and right end areas in the horizontal direction of the captured image. For example, in the state of FIG. 3, in a captured image by the imaging device C1 corresponding to the gate G1, a person P10 located in the center area as illustrated in FIG. 4A is extracted, and a person P20 located in the right end area is detected.

The target determination unit 12 (collation means) determines whether or not the persons P10 and P20 extracted by the target extraction unit 11 are persons moving toward the own gate G1. At this time, when the person P20 is located in an end area (first area), the target determination unit 12 determines whether or not the person P20 is moving toward the own gate G1, on the basis of a captured image captured by the imaging device C2 of the face authentication system 20 corresponding to another gate G2. In this example, since the person P20 is shown in an end area on the right side in the captured image corresponding to the own gate G1 illustrated in FIG. 4A, a captured image captured by the imaging device C2 of the gate G2, adjacent on the right side to the gate G1, is acquired. Specifically, the target determination unit 12 communicates with the face authentication system 20 of the adjacent gate G2 via the communication unit 16, and acquires a captured image captured at the gate G2 at a timing that is the same as the timing when the captured image is captured at the gate G1 (for example, the same time). Note that the positional relationship between the face authentication systems (imaging devices C1, C2, and C3) corresponding to the gates G1, G2, and G3, respectively is assumed to be registered in advance in the respective systems.

Then, the target determination unit 12 checks whether or not the person P20 located in an end area of the captured image of the own gate G1 is shown in the center area (second area) of the captured image of the adjacent gate G2. In the present embodiment, when any person is shown in the center area of the captured image of the adjacent gate G2, such a person is determined to be the person P20 located in the end area of the captured image of the own gate G1. In that case, in the face authentication system 10 of the own gate G1, it is determined to exclude the person P20 located in the end area of the captured image from the collation target. Note that the end area (first area) of the captured image of the own gate G1 and the center area (second area) of the captured image of the adjacent gate G2 are areas different from each other on the captured images, but are overlapped space in the real space.

Figure 4A:
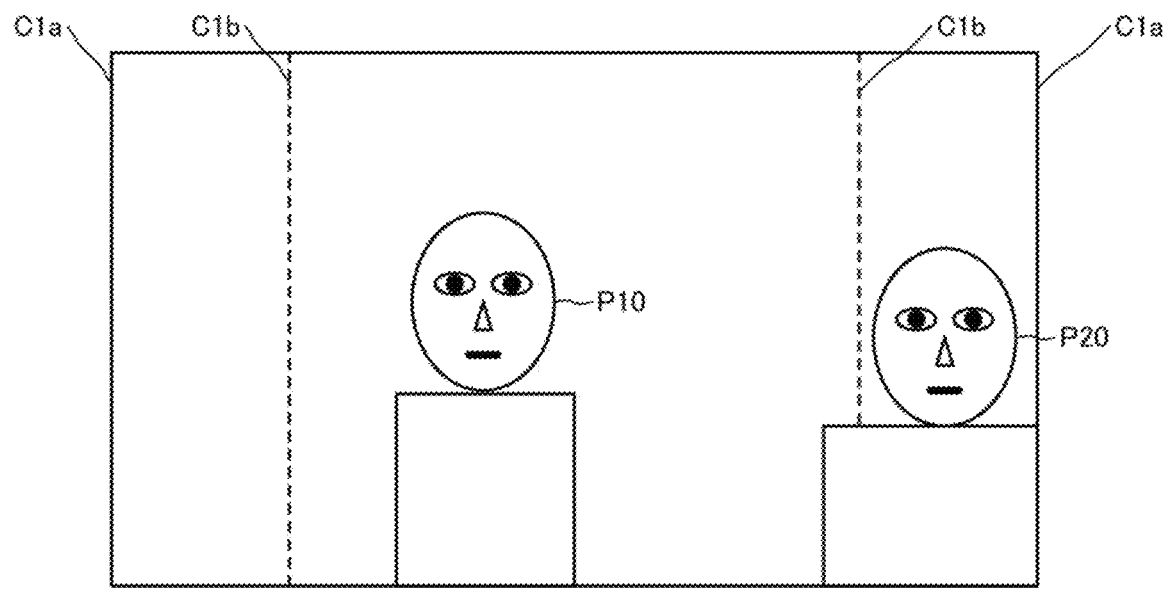
FIG. 4A illustrates a captured image captured in the imaging state of FIG. 3 by the face authentication system disclosed in FIG. 1.
Figure 4B:
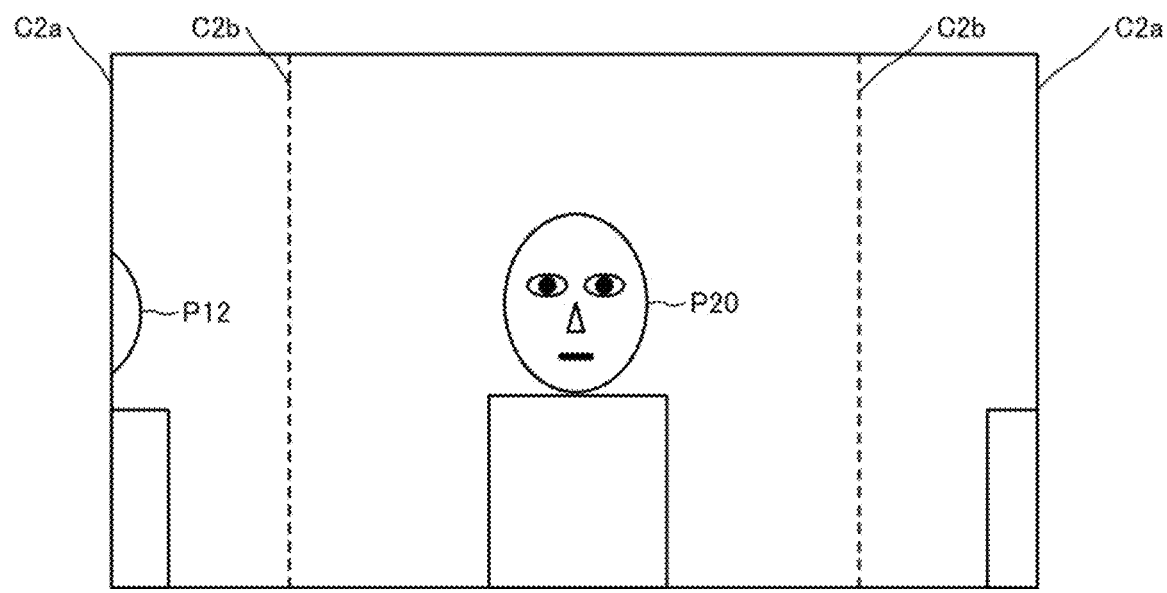
FIG. 4B illustrates a captured image captured in the imaging state of FIG. 3 by the face authentication system disclosed in FIG. 1.
Figure 5:
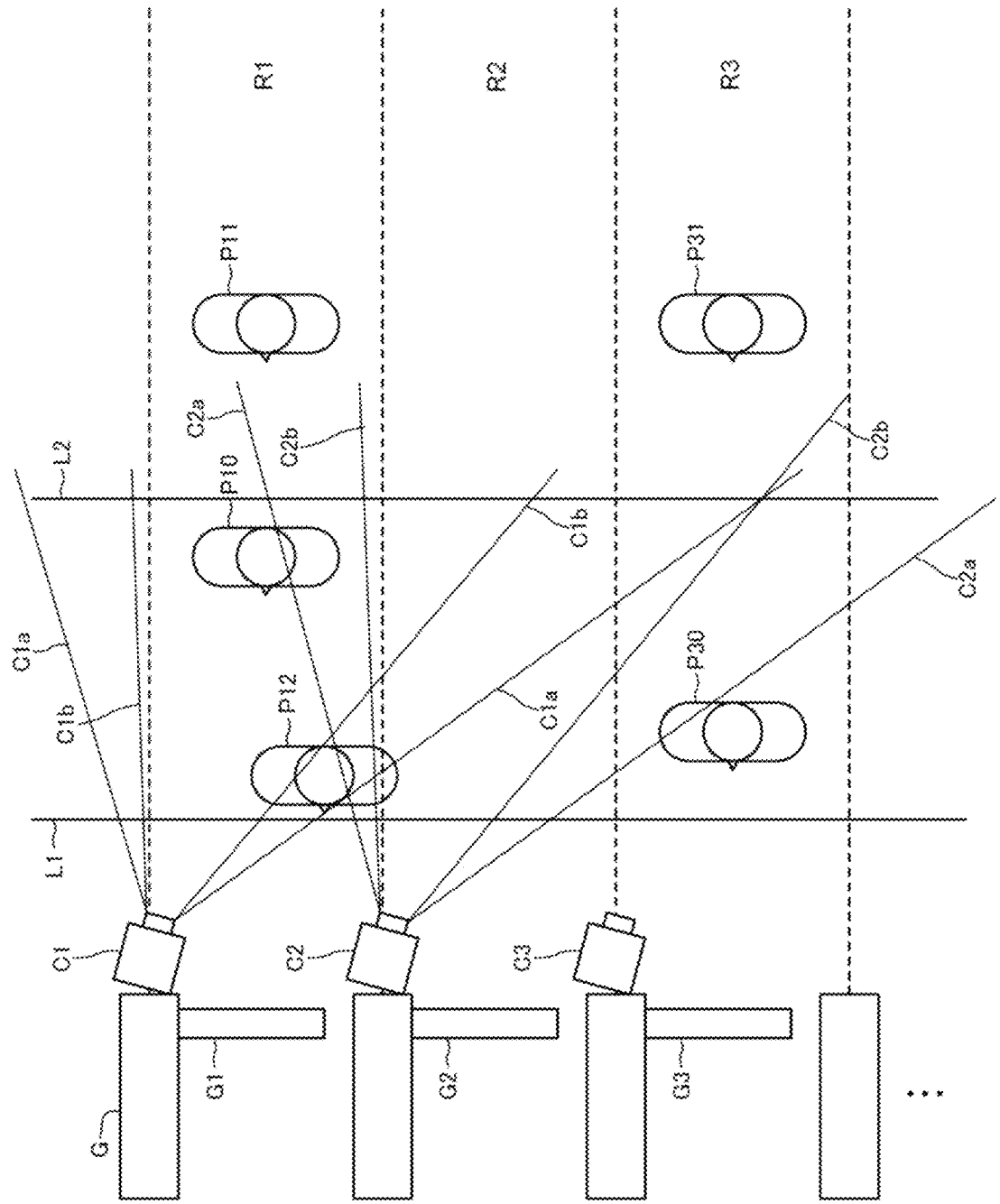
FIG. 5 illustrates an imaging state by the face authentication system disclosed in FIG. 1.
Figure 6A:
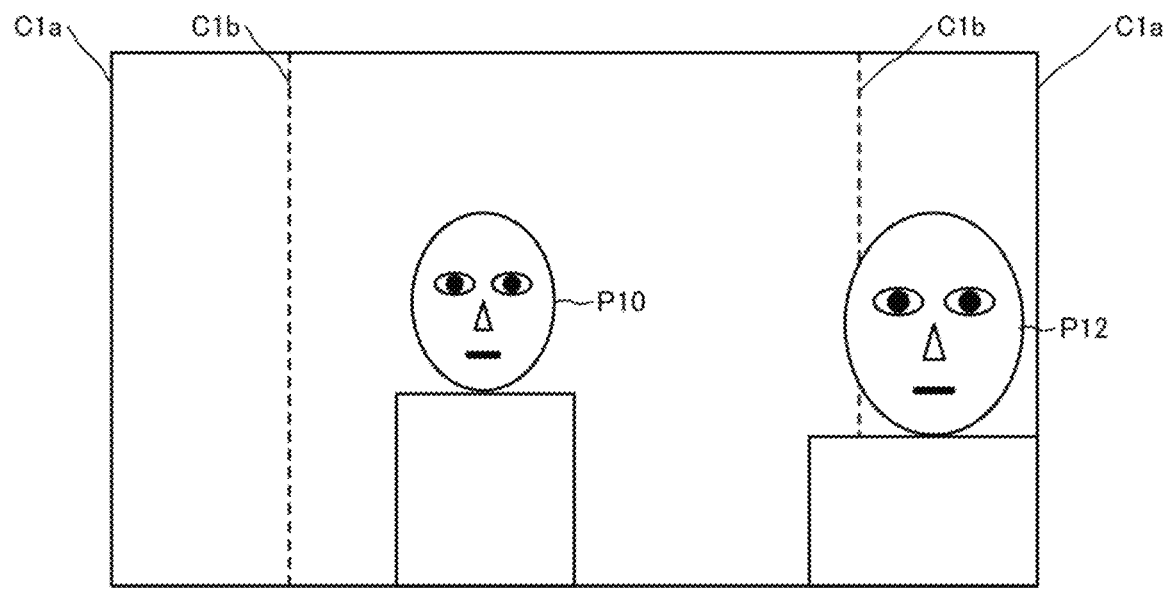
FIG. 6A illustrates a captured image captured in the imaging state of FIG. 5 by the face authentication system disclosed in FIG. 1.
Figure 6B:
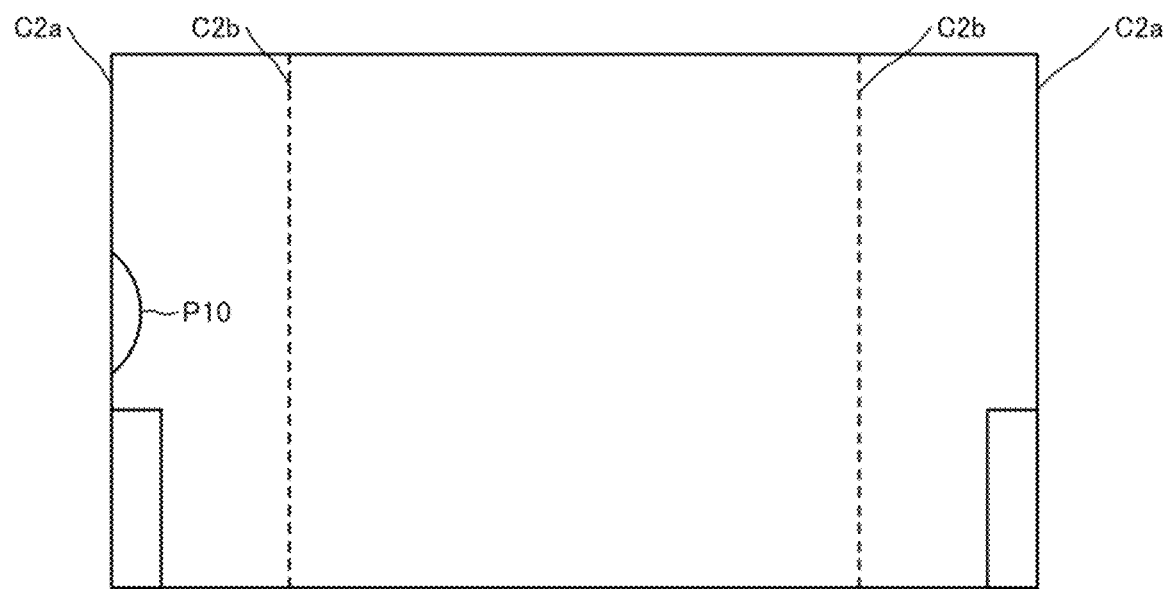
FIG. 6B illustrates a captured image captured in the imaging state of FIG. 5 by the face authentication system disclosed in FIG. 1.

For example, in the state of FIG. 3, the person P20 located in the end area of the captured image of the own gate G1 illustrated in FIG. 4A is located in the center area of the captured image of the adjacent gate G2 illustrated in FIG. 4B. Therefore, the person P20 is excluded from the collation target of the face authentication system 10 of the own gate G1. This means that in the face authentication system 10 of the own gate G1, only the person P10 located in the center area of the captured image is determined to be a collation target. Further, in the state of FIG. 5, the person P12 located in the end area of the captured image of the own gate G1 illustrated in FIG. 6A is not located in the center area of the captured image of the adjacent gate G2 illustrated in FIG.

6B. Therefore, the person P12 is handled as a collation target of the face authentication system 10 of the own gate G1. This means that in the face authentication system 10 of the own gate G1, the person P10 located in the center area of the captured image and the person P12 located in the end area are determined to be collation targets.

Nota that the target determination unit 12 may determine whether or not a person is a collation target of the own gate by a method other than that described above. As an example, when a person is located in the end area (first area) of the captured image, the target determination unit 12 may inquire of the face authentication system 20 corresponding to another gate G2 whether or not the person is a person of the own gate. Specifically, in the example of FIGS. 3, 4A, and 4B, the person P20 is shown in the right end area of the captured image corresponding to the own gate G1 illustrated in FIG. 4A. Therefore, the target determination unit 12 inquires of the face authentication system 20 of the gate G2 adjacent on the right side to the gate G1 whether or not the person P20 is shown in the center area of the adjacent gate G2. Similarly, in the example of FIGS. 5, 6A, and 6B, the person P12 is shown in the right end area of the captured image corresponding to the own gate G1 illustrated in FIG. 6A. Therefore, the target determination unit 12 inquires of the face authentication system 20 of the gate G2 adjacent on the right side to the gate G1 whether or not the person P12 is shown in the center area of the adjacent gate G2. At that time, the target determination unit 12 communicates with the face authentication system 20 of the adjacent gate G2 via the communication unit 16, and inquires whether or not a person is shown in the center area of a captured image captured at the gate G2 at a timing that is the same as the timing when the captured image is captured at the gate G1 (for example, the same time).

Then, upon receipt of the inquiry, the face authentication system 20 of the adjacent gate G2 checks whether or not any person is shown in the center area (second area) of the own captured image, and notifies the target determination unit 12 of the face authentication system 10 of the gate G1, from which the inquiry is made, of the result. Specifically, the face authentication system 20 of the adjacent gate G2 has a function similar to that of the target extraction unit 11 described above. The face authentication system 20 acquires a captured image from the imaging device C2, extracts a person who is a processing target from the captured image, and identifies an area in the captured image where the extracted person is located. Then, the face authentication system 20 of the adjacent gate G2 notifies the face authentication system 10 of the gate G1 whether or not a person is shown in the center area, as a response to the inquiry.

Upon receipt of a notification of the response to the inquiry from the face authentication system of the adjacent gate G20, the target determination unit 12 of the face authentication system 10 of the gate G1 determines as described below, depending on the response. Upon receipt of a notification indicating that a person is shown in the center area of the captured image of the adjacent gate G2 (example of FIGS. 3, 4A, and 4B), the target determination unit 12 determines that such a person is the person P20 located in the end area of the captured image of the own gate G1. In that case, in the face authentication system 10 of the own gate G1, it is determined to exclude the person P20 located in the end area of the captured image from the collation target. On the other hand, upon receipt of a notification indicating that no person is shown in the center area of the captured image of the adjacent gate G2 (example of FIGS. 5, 6A and 6B), the target determination unit 12 determines to handle the person P12 located in the end area of the captured image of the own gate G1 as a collation target.

By determining whether or not a person is a collation target by means of the method described above, a person extraction process is performed in each of the face authentication systems 10 and 20. Therefore, processing is not concentrated on one face authentication system, and also, image transfer is not performed. Accordingly, a processing load on one face authentication system 10 can be suppressed, and a communication amount between the face authentication systems 10 and 20 can also be suppressed. Thereby, quick determination can be made.

The collation unit 13 (collation means) performs a collation process on the person determined to be a collation target in the captured image of the own gate G1 by the target determination unit 12. In other words, the collation unit 13 does not perform a collation process on the person excluded from the collation target by the target determination unit 12 even though the person is shown in the captured image of the own gate G1. Here, a collation process is performed as described below, for example. First, a face area of a person who is a target of a collation process is identified, and a feature amount required for collation is generated from the face area. Then, a collation score such as similarity between the generated feature amount and the feature amount of the person having been registered in the collation data storage unit 17 is calculated, and it is determined whether or not the collation score is higher than a threshold. When the collation score is higher than the threshold, it is determined that the collation has succeeded and that the person who is about to pass through the gate G1 is the person having been registered. At this time, the feature amount of the person to be detected for collation may be a feature amount used in an existing face collation technique, and may be a feature amount calculated by any method. Also, as the collation method, any method may be used.

The gate control unit 14 first determines propriety of passage of the person with respect to the gate G1, based on the collation result by the collation unit 13. Specifically, it is determined that the person whose collation by the collation unit 13 has been succeeded is allowed to pass through. The gate control unit 14 also has a function of displaying the collation result, that is, success or failure of collation, on the display device D1. Moreover, the gate control unit 14 also has a gate control function to open and close the gate G1, and performs control to open the gate G1 for the person determined to be allowed to pass through.

Note that the display device D1 is installed such that the display surface faces the pre-passage side area of the gate G1 so as to be viewable by a person who is about to pass through the gate G1. However, the display device D1 is not necessarily provided.

[Operation]

Next, operation of the face authentication system 10 as described above will be described with reference to the flowchart of FIG. 7. Here, operation of the face authentication system 10 corresponding to the gate G1 will be described. Description will be given on the case where the capturing state by the imaging device C1 is as illustrated in FIGS. 3 to 6B, as an example.

The imaging device C1 corresponding to the gate G1 continuously captures images of the pre-passage side area of the gate G1. Then, the face authentication system 10 regularly performs processing, as described below, on the captured images.

First, the target extraction unit 11 extracts a person (target) to be processed from a captured image (step S1). Then, when the person P20 is located in an end area of the captured image, the target determination unit 12 acquires a captured image captured by the imaging device C2 of the face authentication system 20 corresponding to the adjacent gate G2 (step S2). At this time, a captured image of the adjacent gate G2 that is captured at the same timing as the captured image of the own gate G1 is acquired.

Then, the target determination unit 12 checks whether or not the person P20 located in the end area of the captured image of the own gate G1 is shown in the center area of the captured image of the adjacent gate G2 (step S3). When any person is shown in the center area of the captured image of the adjacent gate G2, the target determination unit 12 determines that such a person is the person P20 located in the end area of the captured image of the own gate G1. In that case, in the face authentication system 10 of the own gate G1, it is determined to exclude the person P20 located in the end area from the collation target.

For example, in the state of FIG. 3, the person P20 located in an end area of the captured image of the own gate G1 illustrated in FIG. 4A is located in the center area of the captured image of the adjacent gate G2 illustrated in FIG. 4B. Therefore, the person P20 is excluded from the collation target of the face authentication system 10 of the own gate G1 (Yes at step S3). Further, in the state of FIG. 5, the person P12 located in an end area of the captured image of the own gate G1 illustrated in FIG. 6A is not located in the center area of the captured image of the adjacent gate G2 illustrated in FIG. 6B. Therefore, the person P12 is not excluded from the collation target by the face authentication system 10 of the own gate G1, and is handled as a collation target (No at step S3).

Then, the collation unit 13 performs a collation process on the person determined to be a collation target in the captured image of the own gate G1 by the target determination unit 12 (step S4). In the example of FIGS. 3, 4A, and 4B, the collation unit 13 initiates the collation process only for the person P10, and in the example of FIGS. 5, 6A, and 6B, the collation unit 13 initiates the collation process for the person P10 and the person P12. In the collation process, first, a feature amount necessary for collation is detected from the face area of a person who is a target of the collation process, and the feature amount is collated with the feature amount of the person having been registered in the collation data storage unit 17, whereby a collation score is acquired. Then, it is determined whether or not the collation score exceeds a threshold.

As a result of the collation process by the collation unit, when collation of the person who is about to pass through has succeeded (Yes at step S5), the gate control unit 14 allows passage of the person with respect to the gate G1 and performs control to open the gate G1 (step S6).

As described above, according to the face authentication system 10 of the present embodiment, it is possible to prevent a collation process with respect to the person P20 who is about to pass through the adjacent gate G2, and to perform a collation process appropriately on the persons P10 and P12 who are about to pass through the own gate G1. For example, in the example of FIGS. 3, 4A, and 4B, a collation process is performed on the person P10 who is about to pass through the own rage G1 but is not performed on the person P20 who is about to pass through the adjacent gate G2. Further, in the example of FIGS. 5, 6A, and 6B, even for the person P12 shown in the end area of the captured image, since the person P12 is about to pass through the own gate G1, a collation process is performed appropriately. As a result, erroneous recognition of a person who is about to pass through another gate can be suppressed.

Note that while a captured image of the own gate G1 is compared with a captured image of the adjacent gate G2 in the above description, it is also possible to compare it with a captured image of another gate (for example, gate G3), without being limited to a captured image of the adjacent gate G2. Moreover, while an end area of a captured image of the own gate G1 is compared with the center area of the adjacent gate G2, areas to be compared with each other is not limited to those described above. Any areas between captured images of different gates may be compared.

Furthermore, while the face authentication system 10 corresponding to the own gate G1 acquires a captured image of the adjacent gate G2 and determines whether or not a person is a collation target in the above description, such a determination process may be performed by the face authentication system of the adjacent gate G2. That is, the face authentication system 10 of the own gate G1 may provide the face authentication system 20 of the adjacent gate G2 with a captured image, and the face authentication system 20 of the adjacent gate G2 may return the determination result to the face authentication system 10 of the own gate G1. Further, such a determination process may be performed by another information processing apparatus.

Moreover, the face authentication system 10 may inquire of the face authentication system 20 of the adjacent gate G2 whether or not a person is shown in the center area of the captured image of the adjacent gate G2 as described above, and determine whether or not the person is a collation target, depending on the response. In that case, when a given notification indicates that a person is shown in the center area of the captured image of the adjacent gate G2, it is determined to exclude the person located in the end area of the captured image of the own gate G1 from the collation target. On the other hand, when a given notification indicates that no person is shown in the center area of the captured image of the adjacent gate G2, it is determined to handle the person located in the end area of the captured image of the own gate G1 as a collation target.

Further, while description has been given on the case where a target that is about to pass through the gate G1 is a person as an example, it is not limited to a person but may be any object. For example, an object such as baggage is also acceptable.

Second Exemplary Embodiment

Figure 11A:
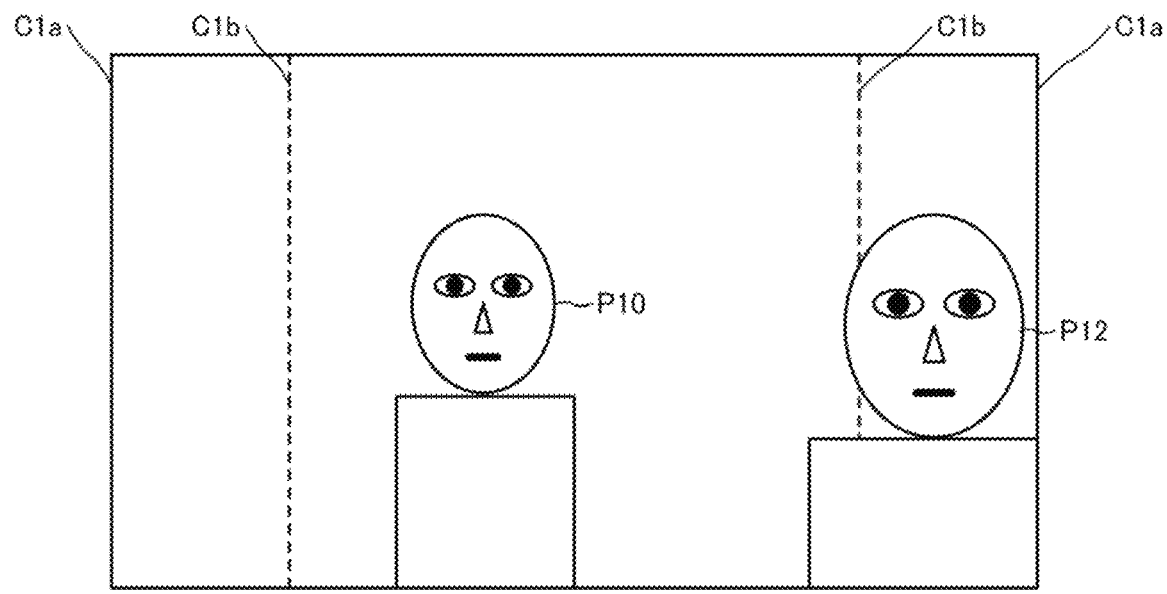
FIG. 11A illustrates a captured image captured in the imaging state of FIG. 10 by the face authentication system according to the second exemplary embodiment of the present invention.
Figure 11B:
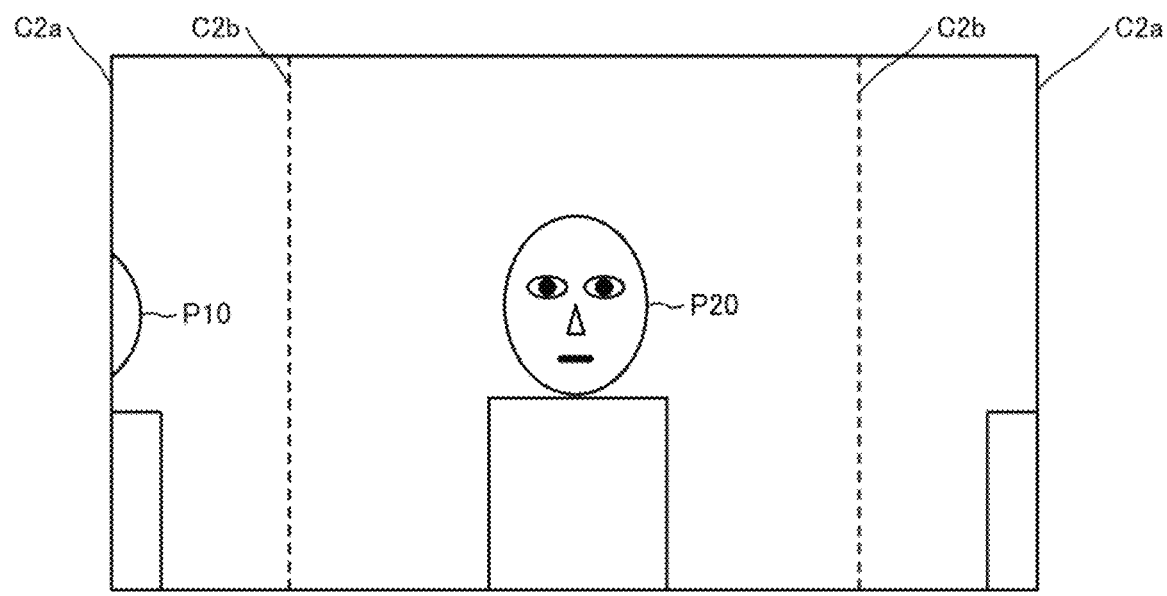
FIG. 11B illustrates a captured image captured in the imaging state of FIG. 10 by the face authentication system according to the second exemplary embodiment of the present invention.
Figure 12:
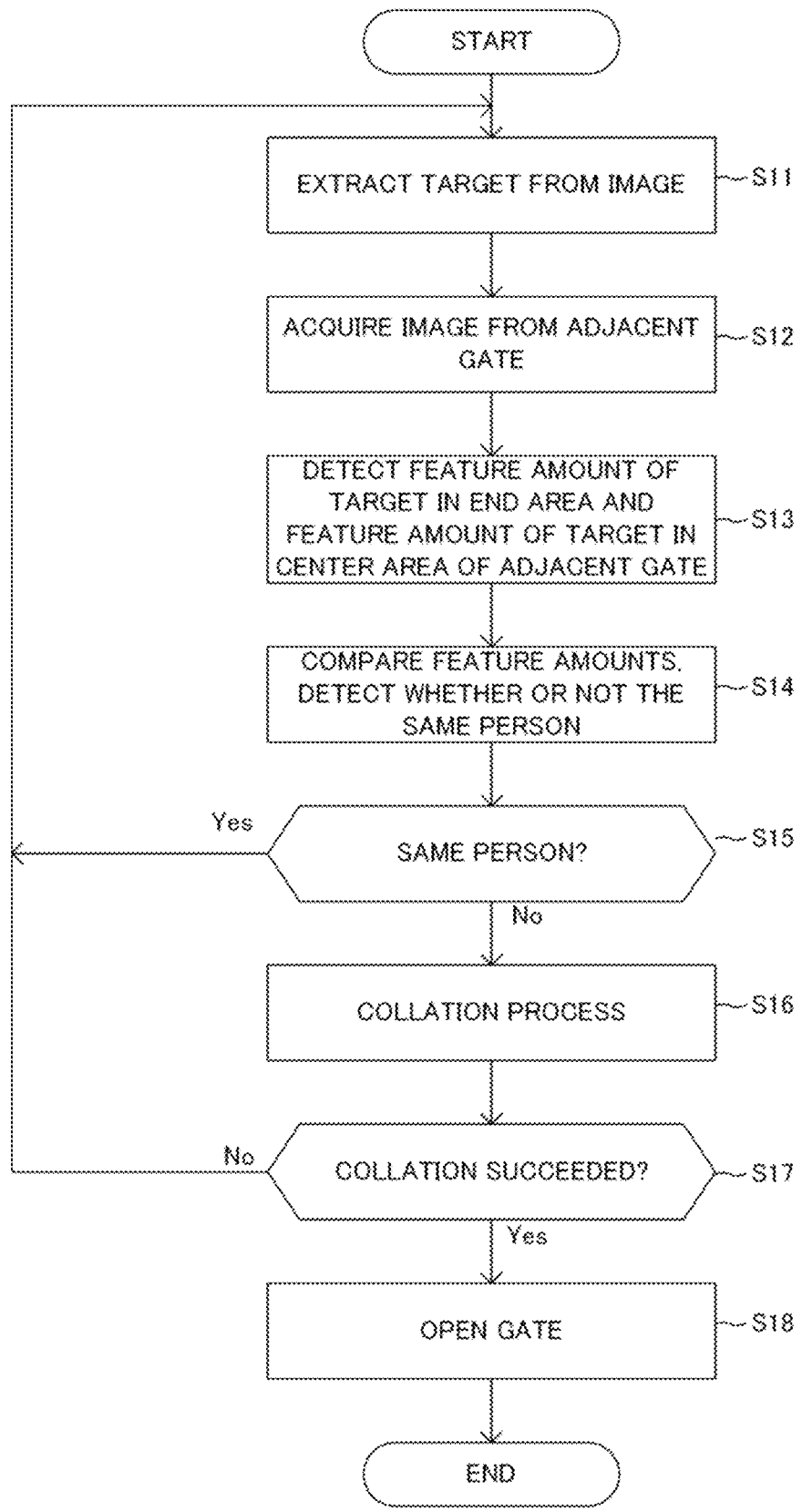
FIG. 12 is a flowchart illustrating a processing operation by the face authentication system according to the second exemplary embodiment of the present invention.

A second exemplary embodiment of the present invention will be described with reference to FIGS. 8 to 12. FIGS. 8 to 12 are diagrams for explaining a processing operation of the face authentication system. In particular, FIG. 12 is a flowchart illustrating an operation of the face authentication system.

A face authentication system 10 of the present embodiment has a configuration similar to that of the face authentication system of the first exemplary embodiment described above. However, a process of determining whether or not to handle a person shown in a captured image of the own gate G1 as a collation target is different. A configuration different from that of the first exemplary embodiment will be mainly described in detail below.

In the present embodiment, when the target extraction unit 11 extracts the person P20 from an end area of a captured image of the own gate G1 (step S11), the target determination unit 12 determines whether or not a person same as the person P20 is located in the center area of a captured image of another gate G2. In this example of FIGS. 8 and 10, since the person P20 is shown in the right end area in the captured image corresponding to the own gate G1, the target determination unit 12 acquires a captured image captured by the imaging device C2 of the gate G2, adjacent on the right side to the gate G1 (step S12). Specifically, the target determination unit 12 communicates with the face authentication system 20 of the adjacent gate G2 via the communication unit 16, and acquires a captured image captured at the gate G2 at the same timing as the captured image captured at the gate G1 (for example, the same time). Note that the positional relationship between the face authentication systems (imaging devices C1, C2, and C3) corresponding to the gates G1, G2, and G3, respectively, is assumed to be registered in advance in the respective systems.

Then, the target determination unit 12 determines the sameness between the person P20 located in the end area of the captured image of the own gate G1 and the person P20 located in the center area (second area) of the captured image of the adjacent gate G2. In the present embodiment, first, a face area of each person is specified, and a feature amount required for collation is extracted from the face area (step S13). Then, from the feature amounts of the both persons, it is determined whether or not the both persons are the same person (step S14). Note that the process of determining whether or not the persons match each other may be a process having relatively low accuracy compared with the collation process described below. For example, it is possible to detect only a feature amount of a part of a person, or detect gender or age from the feature amount to thereby determine the sameness from such information. However, any process may be used as a process of determining the sameness of the persons.

Then, when it is determined that the same person as the person P20 located in an end area of the captured image of the own gate G1 is located in the center area of the captured image of the adjacent gate G2, the target determination unit 12 determines that the person P20 is a person moving toward the adjacent gate G2 (Yes at step S15). In that case, in the face authentication system 10 of the own gate G1, it is determined to exclude the person P20 located in the end area from the collation target. On the other hand, when it is determined that the same person as the person P12 located in an end area of the captured image of the own gate G1 is not located in the center area of the captured image of the adjacent gate G2, the target determination unit 12 determines that the person P12 is a person moving toward the own gate G1 (No at step S15). In that case, in the face authentication system 10 of the own gate G1, it is determined that the person P12 located in the end area is a collation target. Note that the end area (first area) of the captured image of the own gate G1 and the center area (second area) of the captured image of the adjacent gate G2 are areas different from each other when the captured images are compared, but are areas overlapping each other in the real space.

Figure 9A:
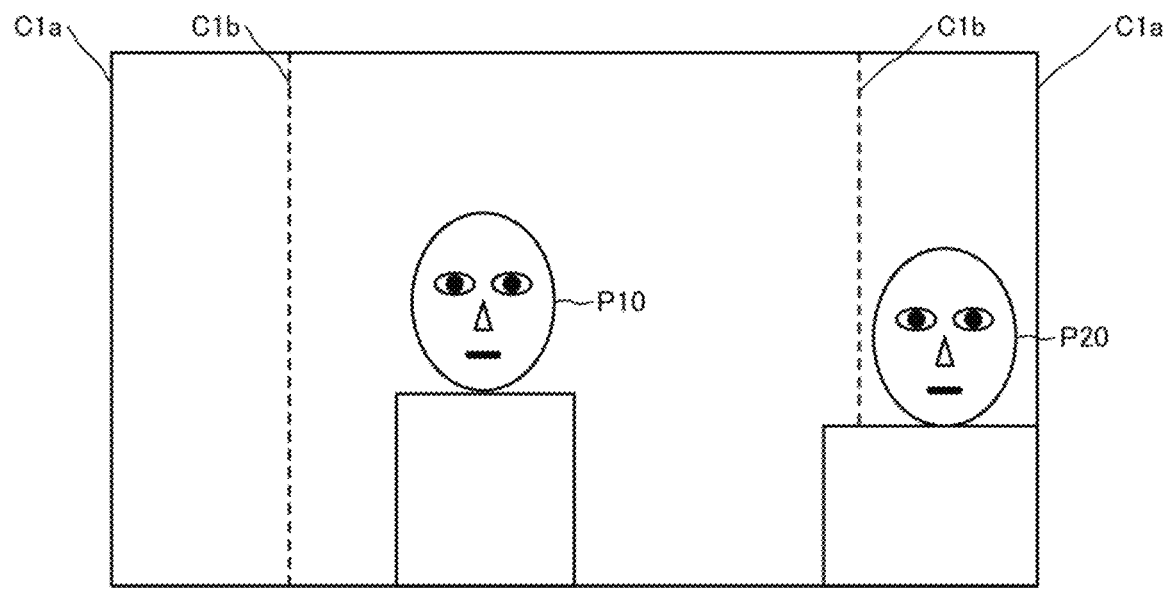
FIG. 9A illustrates a captured image captured in the imaging state of FIG. 8 by the face authentication system according to the second exemplary embodiment of the present invention.
Figure 9B:
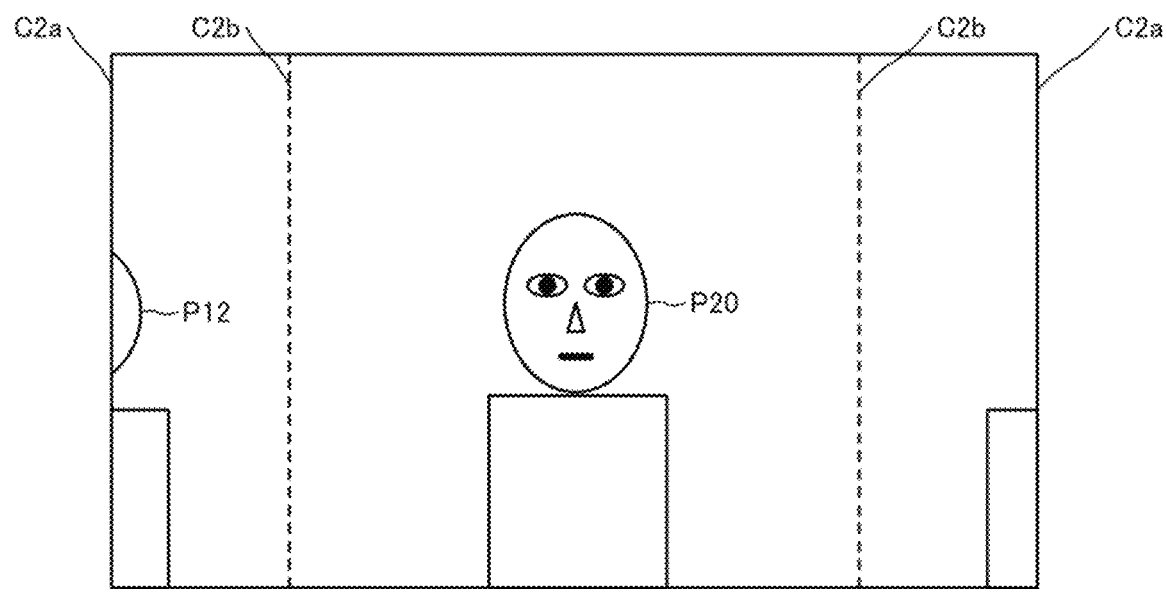
FIG. 9B illustrates a captured image captured in the imaging state of FIG. 8 by the face authentication system according to the second exemplary embodiment of the present invention.
Figure 10:
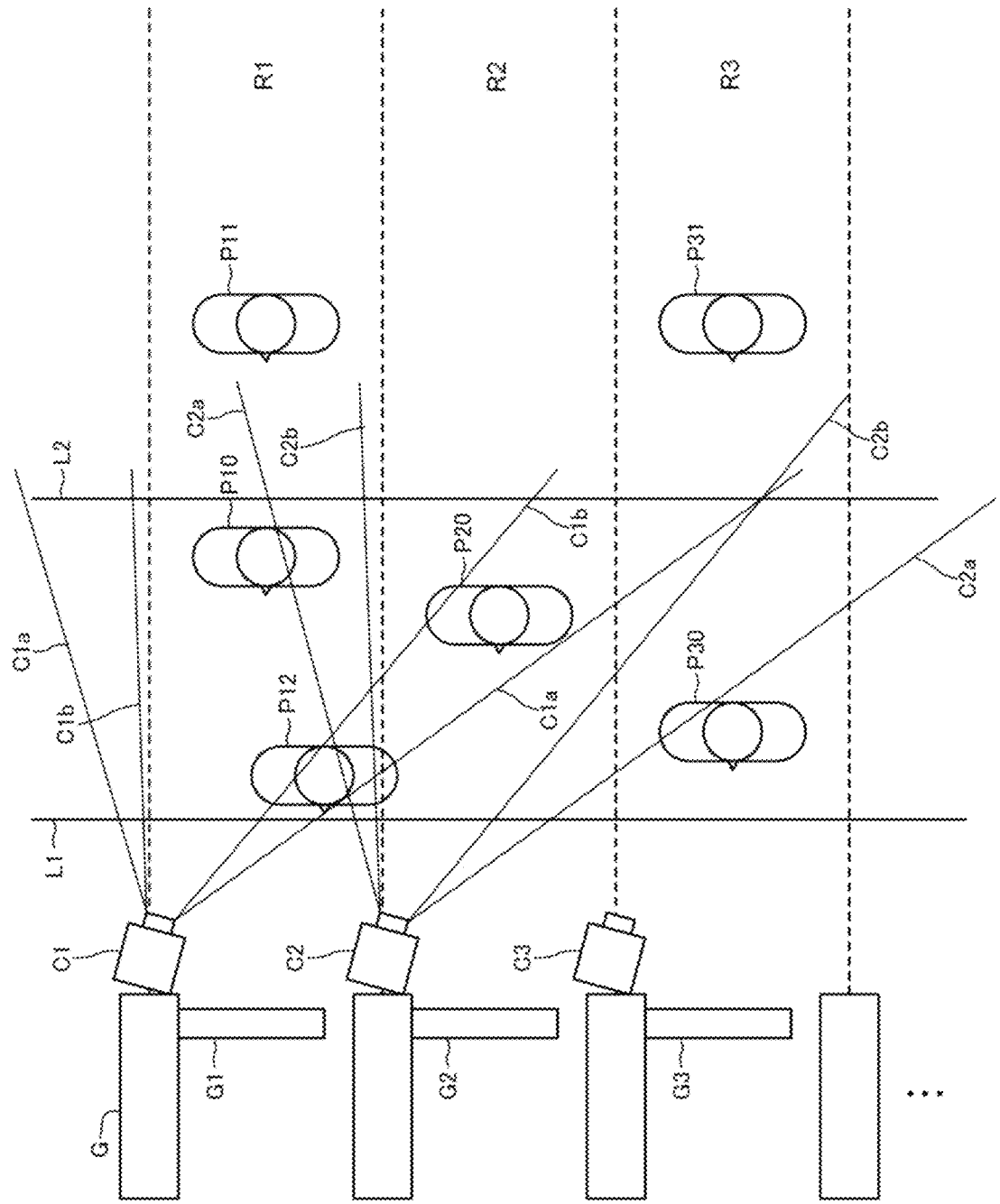
FIG. 10 illustrates an imaging state by the face authentication system according to the second exemplary embodiment of the present invention.

For example, in the state of FIG. 8, the person P20 located in an end area of the captured image of the own gate G1 illustrated in FIG. 9A is located in the center area of the captured image of the adjacent gate G2 illustrated in FIG. 9B. Therefore, the person P20 is excluded from the collation target of the face authentication system 10 of the own gate G1. This means that in the face authentication system 10 of the own gate G1, only the person P10 located in the center area of the captured image is determined to be a collation target. Further, in the state of FIG. 10, a person who is the same as the person P12 located in the end area of the captured image of the own gate G1 illustrated in FIG. 11A is not located in the center area of the captured image of the adjacent gate G2 illustrated in FIG. 11B. Therefore, the person P12 is handled as a collation target of the face authentication system 10 of the own gate G1. This means that in the face authentication system 10 of the own gate G1, the person P10 located in the center area and the person P12 located in the end area of the captured image are determined to be collation targets.

The collation unit 13 (collation means) performs a collation process on the person determined to be a collation target in the captured image of the own gate G1 by the target determination unit 12 (step S16). In other words, the collation unit 13 does not perform a collation process on the person excluded from the collation target by the target determination unit 12 even though the person is shown in the captured image of the own gate G1. Here, a collation process is performed as described below, for example. First, the face area of a person who is a target of the collation process is identified, and a feature amount required for collation is generated from the face area. Then, a collation score such as similarity between the generated feature amount and the feature amount of the person having been registered in the collation data storage unit 17 is calculated, and it is determined whether or not the collation score is higher than a threshold. When the collation score is higher than the threshold, it is determined that the collation has succeeded and that the person who is about to pass through the gate G1 is the person having been registered. Note that any method may be used as the collation method.

The gate control unit 14 determines propriety of passage of the person with respect to the gate G1, based on the collation result by the collation unit 13. Specifically, the gate control unit 14 determines that the person whose collation by the collation unit 13 has succeeded is allowed to pass through (step S17), and performs control to open the gate G1 (step S18).

As described above, in the face authentication system of the present embodiment, by extracting and comparing feature amounts of persons in captured images of the gates, it is possible to determine whether or not the same target is shown in captured images of other gates more reliably. Then, it is possible to exclude the target shown in an overlapped manner for a given gate and another gate from the collation process, and to suppress erroneous recognition of a target who is about to pass through a gate. Moreover, it is possible to use the feature amounts of the targets extracted for determining overlapping of the targets, for the collation process. This enhances the efficiency of the process.

Note that while description has been given on the case where a target that is about to pass through the gate G1 is a person as an example, it is not limited to a person but may be any object. For example, an object such as baggage is also acceptable.

Third Exemplary Embodiment

Next, a third exemplary embodiment of the present invention will be described. In the face authentication system 10 of the present embodiment, basically, it is determined whether or not a person shown in an end area of a captured image is a person moving toward the own gate G1, similar to the first exemplary embodiment described above. That is, it is determined whether or not a person shown in an end area of a captured image of the own gate G1 is a person moving toward the own gate G1, depending on whether or not the person is shown in the center area of a captured image captured by the face authentication system 20 corresponding to another gate G2. However, in the present embodiment, the determination process differs as described below. The configuration different from that of the first exemplary embodiment will be mainly described in detail below.

First, the target extraction unit 11 of the present embodiment acquires a captured image from the imaging device C1, and extracts a person who is a processing target from the captured image. At that time, the target extraction unit 11 also identifies an area in the captured image where the extracted person is located. Then, the target extraction unit 11 of the present embodiment determines whether or not the feature that is determination information of the person shown in the end area exceeds a reference value, and depending on the determination result, performs a determination process on whether or not the person is a person moving toward the own gate G1.

As an example, the target extraction unit 11 first extracts the face area of a person located in an end area of a captured image. Extraction of the face area of a person is performed by determining the position, color, and the like with respect to the entire image of a moving person. Then, the target extraction unit 11 detects the feature of the person that is determination information, from the face area. In the present embodiment, the feature of a person as determination information is a distance between the eyes of a person (inter-eye distance).

Then, the target determination unit 12 of the present embodiment checks whether or not the inter-eye distance that is determination information detected by the target determination unit 11 exceeds a reference value. Here, in the present embodiment, the reference value is set to a value enabling determination on whether or not a person shown in an end area of a captured image of the own gate G1 is located on the lane G1 of the own gate G1. For example, in the state of FIG. 10 described above, it is considered that the inter-eye distance of the person P12 shown in an end area of the captured image of the own gate G1 and moving toward the own gate G1 is larger than the inter-eye distance of the person P20 of the adjacent gate G2. In consideration of it, the reference value is set to a value between the inter-eye distance of the person P12 shown in an end area of the captured image of the own gate G1 and moving toward the own gate G1 and the inter-eye distance of the person P20 of the adjacent gate G2.

Then, when the inter-eye distance of the person shown in the end area of the captured image of the gate G1 detected by the target extraction unit 11 exceeds the reference value, the target determination unit 12 determines that the person is a person moving toward the own gate G1, and handles the person as a target of a collation process. That is, when the inter-eye distance of a person exceeds the reference value, comparison with a captured image of the adjacent gate G2 is not performed, and a collation process is directly performed on the person as a person moving toward the own gate G1.

On the other hand, when the inter-eye distance of the person shown in the end area of the captured image of the gate G1 detected by the target extraction unit 11 is equal to or smaller than the reference value, since there is a possibility that the person is a person moving toward the adjacent gate G2, the target determination unit 12 performs comparison with a captured image of the adjacent gate G2. That is, as described in the first exemplary embodiment, it is checked whether or not any person is shown in the center area of the captured image of the adjacent gate G2. When a person is shown in the center area of the captured image of the adjacent gate G2, it is determined that the person shown in the end area of the captured image of the own gate G1 is a person moving toward the adjacent gate G2, and the person is excluded from the target of a collation process. When no person is shown in the center area of the captured image of the adjacent gate G2, it is determined that the person shown in the end area of the captured image of the own gate G1 is a person moving toward the own gate G1, and the person is handled as a target of a collation process.

Through the process described above, in the example of FIGS. 10, 11A and 11B, for example, the person P12 is shown in an end area of the captured image of the own gate G1, but since the person P12 is close to the imaging device C1 of the G1, the inter-eye distance that is determination information showing the size of the person P12 is larger than the reference value. Therefore, it is determined that the person P12 is a person moving toward the own gate G1, and the person P12 is handled as a target of a collation process. That is, even if the person P20 moving toward the adjacent gate G2 exists, the person P12 of the own gate G1 can be handled as a target of a collation process.

On the other hand, in the example of FIGS. 8, 9A and 9B, for example, the person P20 is shown in an end area of the captured image of the own gate G1, but since the person P20 is far away from the imaging device C1 of the G1, the inter-eye distance that is determination information showing the size of the person P20 is equal to or smaller than the reference value. Therefore, it is checked whether or not the person P20 is shown in the center area of the captured image of the adjacent gate G2. In that case, since a person is shown in the center area of the captured image of the adjacent gate G2, it is determined that the person shown in the end area of the captured image of the own gate G1 is a person moving toward the adjacent gate G2, and the person is excluded from the target of a collation process.

Note that while description has been given on the case where the determination information of a person shown in the end area of the captured image of the own gate G1 is an inter-eye distance, the feature of the person as the determination information may be a distance between other parts of the face of a person, or a value representing the size of another part of a person. However, the feature of a person that is determination information is not necessarily limited to a value representing the size of a part of a person.

Fourth Exemplary Embodiment

Figure 13:
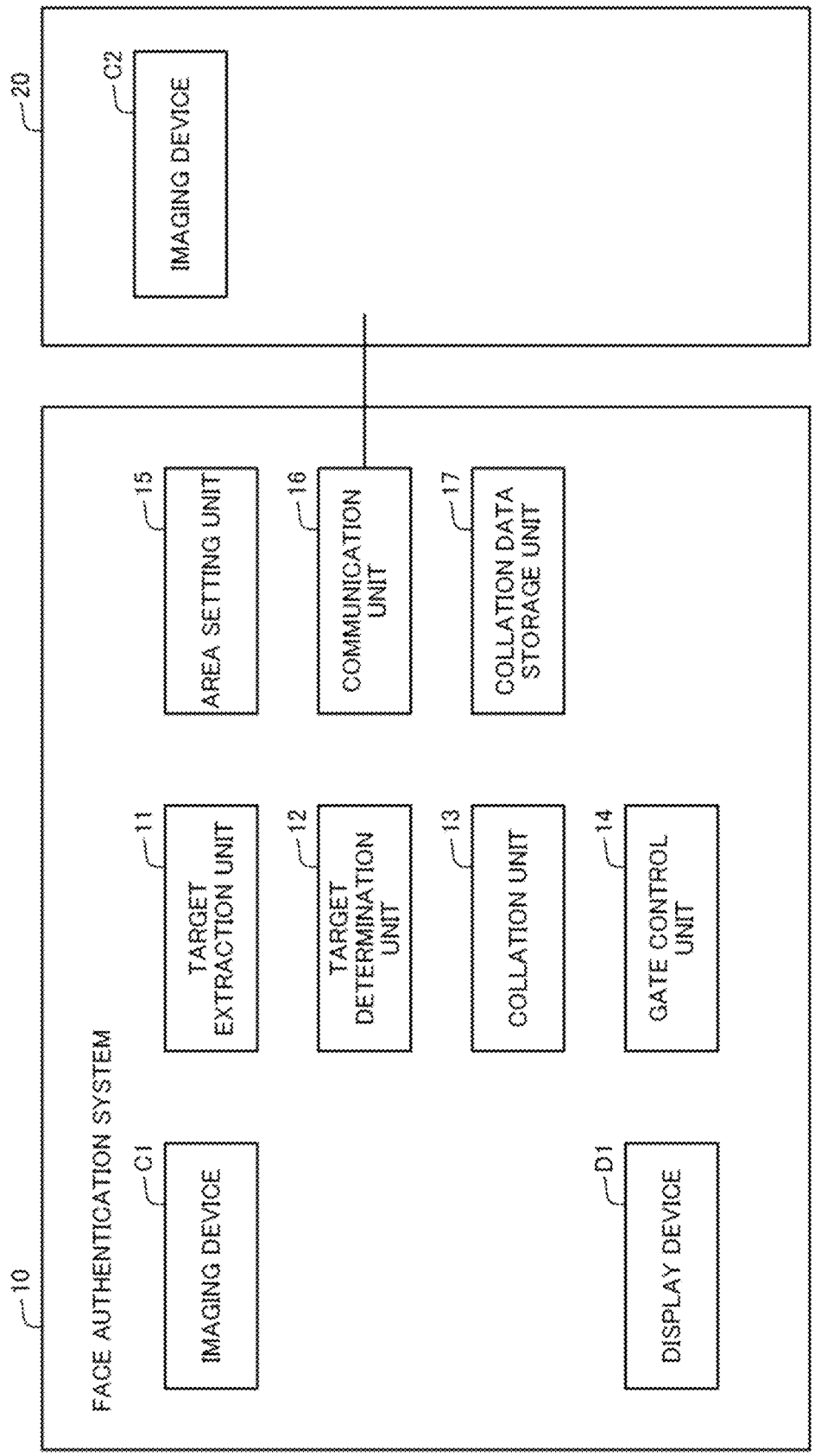
FIG. 13 is a block diagram illustrating a configuration of a face authentication system according to a fourth exemplary embodiment of the present invention.
Figure 14:
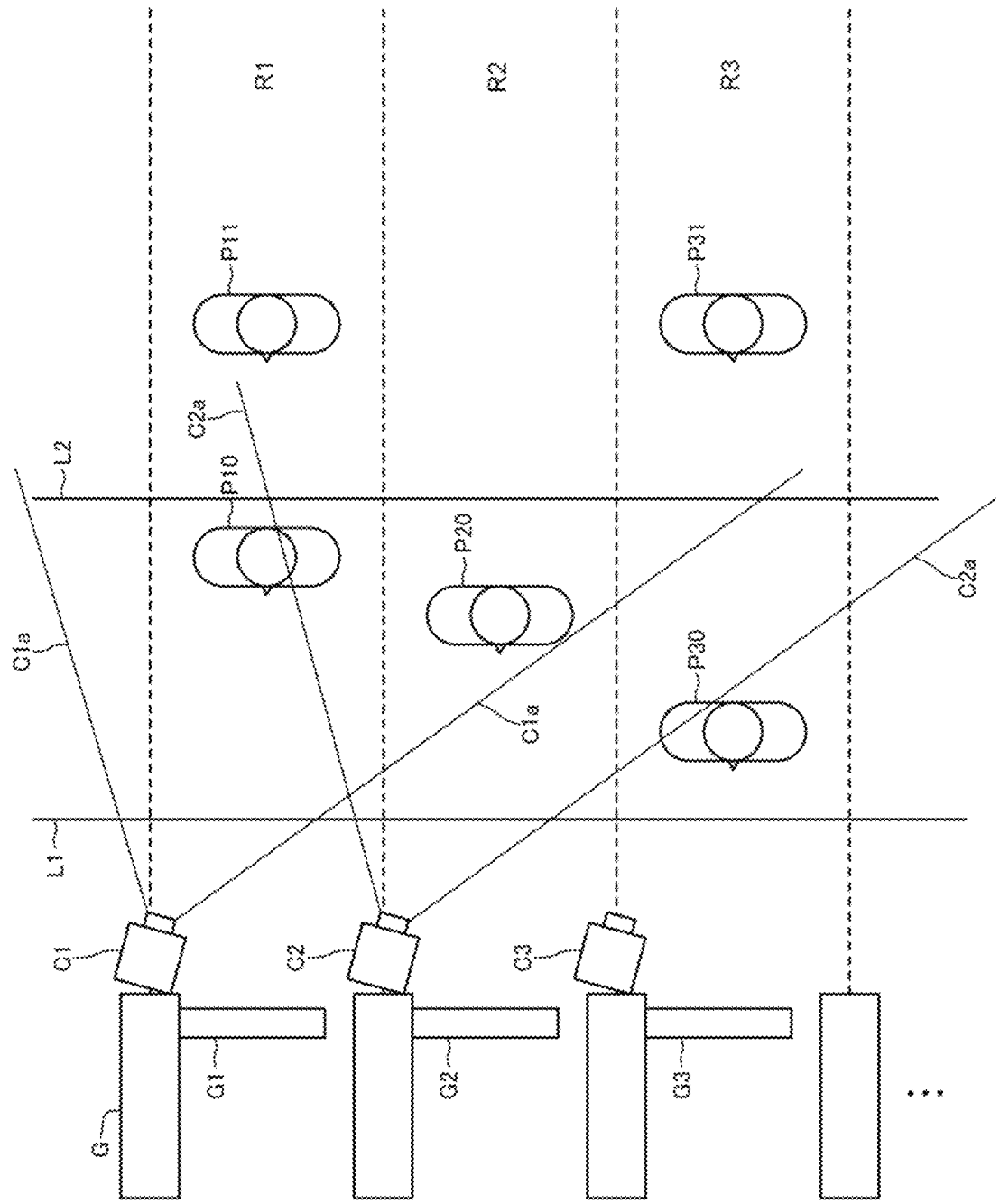
FIG. 14 illustrates an imaging state by the face authentication system according to the fourth exemplary embodiment of the present invention.
Figure 15A:
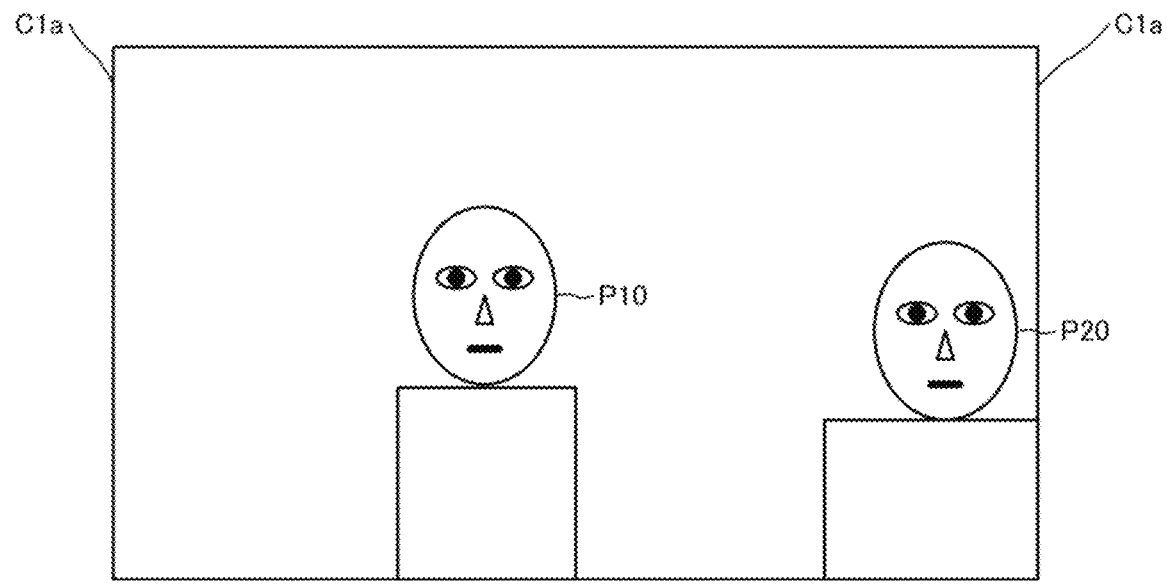
FIG. 15A illustrates a captured image captured in the imaging state of FIG. 12 by the face authentication system according to the fourth exemplary embodiment of the present invention.
Figure 15B:
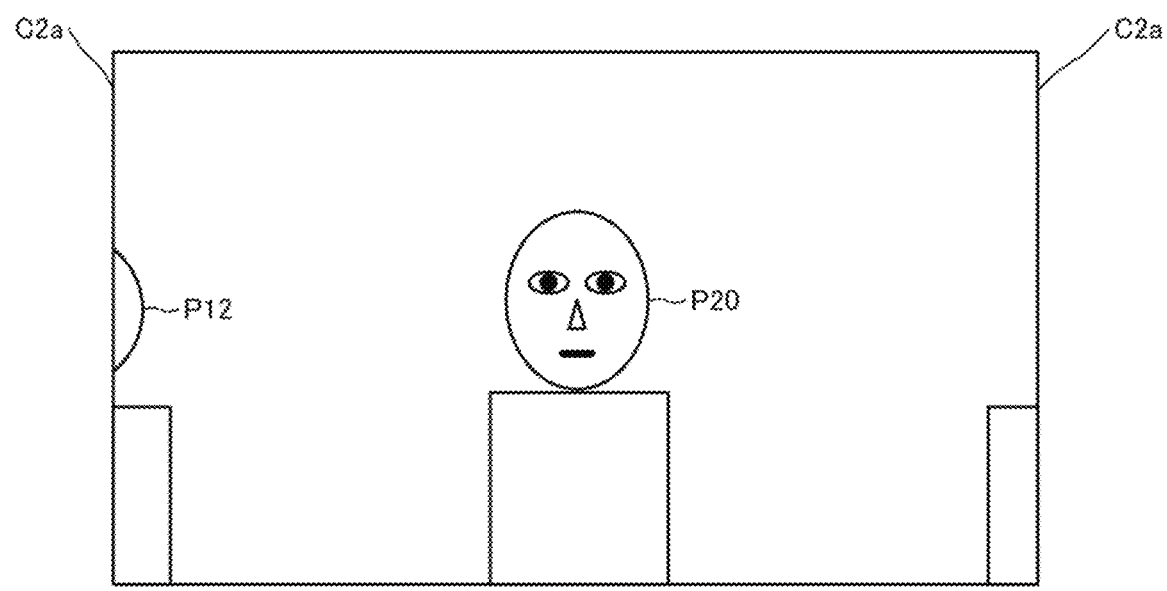
FIG. 15B illustrates a captured image captured in the imaging state of FIG. 12 by the face authentication system according to the fourth exemplary embodiment of the present invention.
Figure 16A:
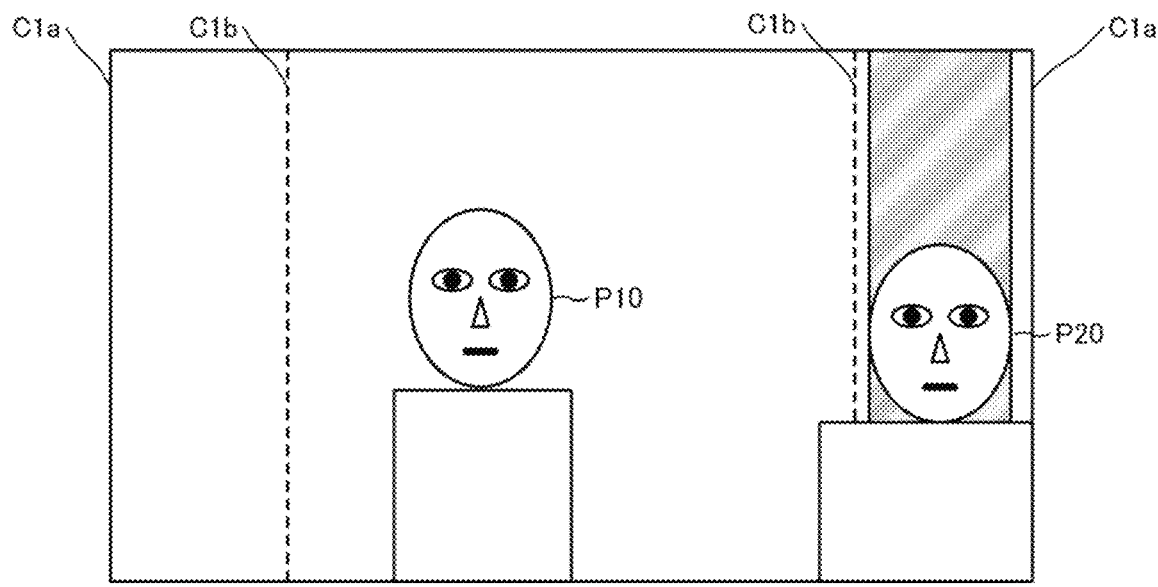
FIG. 16A illustrates a state of image processing by the face authentication system according to the fourth exemplary embodiment of the present invention.
Figure 16B:
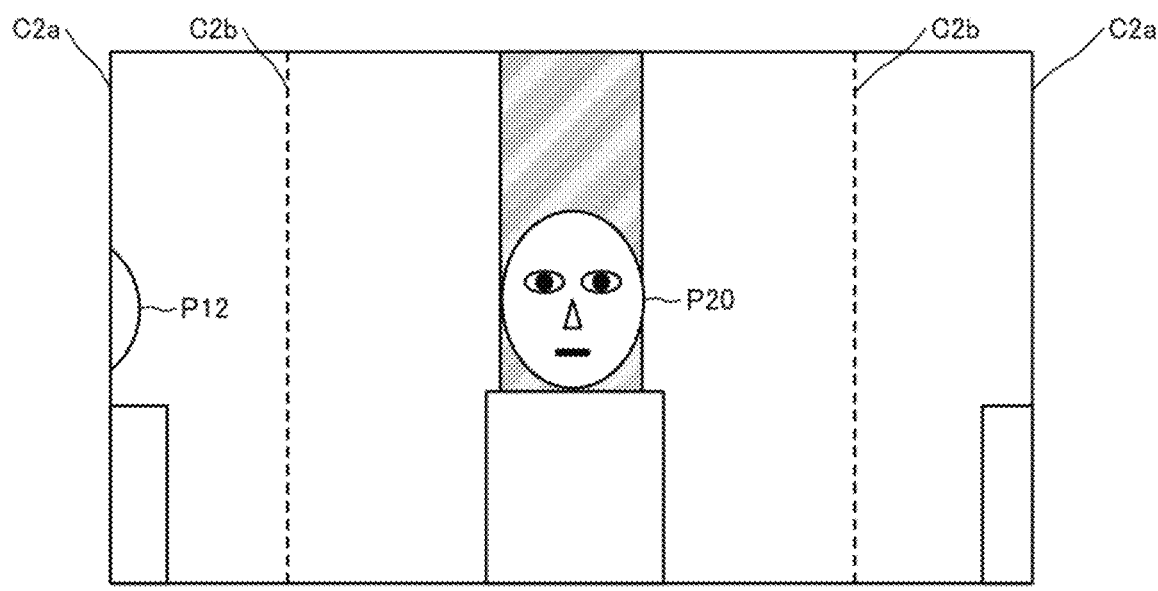
FIG. 16B illustrates a state of image processing by the face authentication system according to the fourth exemplary embodiment of the present invention.

Next, a fourth exemplary embodiment of the present invention will be described with reference to FIGS. 13 to 16B. FIG. 13 is a block diagram showing the configuration of a face authentication system of the present embodiment, and FIGS. 14 to 16 are diagrams for explaining a processing operation of the face authentication system.

A face authentication system 10 of the present embodiment has a configuration similar to that of the first exemplary embodiment described above. However, as described in the first and second exemplary embodiments, the face authentication system 10 also has a function of setting overlapping areas in which captured images of adjacent gates are overlapped each other and which are compared with each other to check whether or not the same person is located. The configuration different from that of the first and second exemplary embodiments will be mainly described in detail below.

As illustrated in FIG. 13, a face authentication system 10 of the present embodiment includes an area setting unit 15 (area setting means) constructed by execution of a program by the arithmetic unit. The area setting unit 15 first acquires a captured image from the imaging device C1 of the own gate G1, and also acquires a captured image from the imaging device C2 of the adjacent gate G2. At this time, the area setting unit 15 communicates with the face authentication system 20 of the adjacent gate G2 via the communication unit 16, and acquires a captured image captured at the gate G2 at a timing that is the same as the timing (for example, the same time) when the captured image is captured at the gate G1.

Then, the area setting unit 15 extracts persons from the acquired captured image of the gate G1 and the captured image of the gate G2. Extraction of a person is performed by, for example, extracting a moving object, or performing determination from the position of a characteristic shape part or the position of a color with respect to the overall shape or the overall image. Then, the area setting unit 15 checks whether or not the same person is shown in both captured images. At this time, the area setting unit 15 specifies the face areas of the respective persons shown in the captured images, and detects feature amounts required for collation from the face areas. Then, from the feature amounts of the persons, it is determined whether or not the persons are the same person. Note that any process may be used as a process of determining the sameness of the persons.

Then, when the area setting unit 15 determines that the same person is shown in the captured images, the area setting unit 15 sets areas surrounding the portions where the same person is shown in the respective captured images as overlapping areas that overlap each other in the respective captured images. At this time, the set overlapping area is an area obtained by expanding the part in which the same person is detected up to the upper and lower ends of the captured image and further expanding the area by a predetermined range in the horizontal direction of the captured image. In particular, in the captured image of the own gate G1, it is considered that the part where the same person is extracted may be positioned near one end in the horizontal direction of the captured image. However, a range slightly expanded in the horizontal direction with respect to the part where the person is extracted is set as an overlapping area (first area), and an area having the same size near the other end is also set as the overlapping area (first area). On the other hand, in the captured image of the adjacent gate G2, it is considered that a part where the same person is extracted is positioned near the center in the horizontal direction of the captured image. However, a range, expanded in the horizontal direction to be larger than the overlapping area of the end area with respect to the part where the person is extracted, is set as an overlapping area (second area). That is, in the present embodiment, the center area is set to be larger than the end area. However, the method of setting the size of the end area and the center area is not limited to the method described above.

As an example, in the state shown in FIG. 14, first, a captured image of a capturing area between lines C1$a$ is acquired from the imaging device C1 of the own gate G1, and a captured image of a capturing area between lines C2$a$ is acquired from the imaging device C2 of the adjacent gate G2. It is assumed that by extracting the same person from the captured images of FIGS. 15A and 15B, the same person P20 is detected in an end area of the captured image of the own gate G1 and in the center area of the captured image of the adjacent gate G2. In that case, as for the captured image of the own gate G1, an area defined by the lines C1$a$ and C1$b$ obtained by further expanding the area (hatched area), expanded in the up and down direction of the part where the person P20 is extracted, slightly in the horizontal direction is set as an overlapping area, as illustrated in FIG. 16A. Further, in the end area on the opposite side in the horizontal direction, an overlapping area defined by the lines C1$a$ and C1$b$ is set. On the other hand, as for the captured image of the adjacent gate G2, an area defined by lines C2$b$ obtained by further expanding the area (hatched area), expanded in the up and down direction of the part where the person P20 is extracted, in the horizontal direction is set as an overlapping area, as illustrated in FIG. 16B.

As described above, in the present embodiment, the area setting unit 15 of the face authentication system 10 corresponding to the gate G1 automatically set an end area of a captured image of the own gate G1 and the center area of a captured image of the adjacent gate G2 as overlapping areas. Then, as described in the first and second exemplary embodiments, the face authentication system 10 performs processing of extracting a person from the end area of a captured image of the own gate G1 and the center area of a captured image of the adjacent gate G2 having been set, and determining whether or not the same person exists in both areas.

According to the face authentication system 10 of the fourth exemplary embodiment, on the basis of the person in a captured image corresponding to a given gate and a person in a captured image corresponding to another gate, it is possible to automatically set overlapping areas between the captured images corresponding to the gates. As a result, it is possible to set overlapping areas appropriately between the imaging devices C1 and C2 of the gates G1 and G2 adjacent to each other, to realize easy use of the collation system, and to suppress erroneous recognition with higher accuracy.

Note that while an example of setting overlapping areas by using images of persons who are about to pass through the gates G1 and G2 has been described, it is possible to set overlapping areas by using any objects shown in the captured images, without being limited to persons. For example, it is possible to determine the sameness of articles or landscapes shown in the captured images, and on the basis of the determination result, to set overlapping ranges of the respective captured images.

Fifth Exemplary Embodiment

Figure 17:
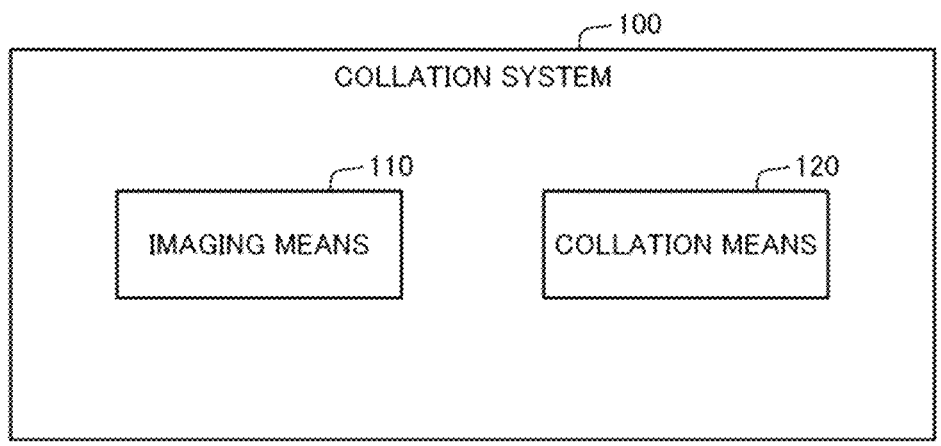
FIG. 17 is a block diagram illustrating a configuration of a collation system according to a fifth exemplary embodiment of the present invention.
Figure 18:
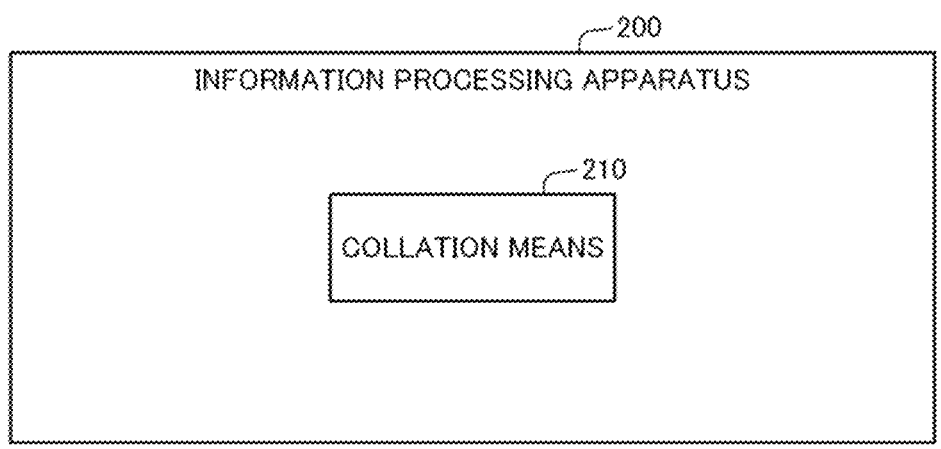
FIG. 18 is a block diagram illustrating a configuration of an information processing apparatus according to the fifth exemplary embodiment of the present invention.

Next, a fifth exemplary embodiment of the present invention will be described with reference to FIGS. 17 and 18. FIG. 17 is a block diagram illustrating a configuration of a collation system according to the fifth exemplary embodiment. FIG. 18 is a block diagram illustrating a configuration of an information processing apparatus according to the fifth exemplary embodiment. Note that the present embodiment shows the outline of the configuration of the face authentication system described in the first to fourth exemplary embodiments.

As illustrated in FIG. 17, a collation system 100 of the present embodiment includes an imaging means 110 for acquiring a captured image of each of pre-passage side areas with respect to each of gates arranged in parallel with each other, and a collation means 120 for performing, for each of the gates, a collation process on the captured image of the pre-passage side area between a previously registered target and a target in the captured image.

Then, the collation means 120 performs a collation process on the basis of a target in a captured image corresponding to a given gate and a target in a captured image corresponding to another gate.

Further, in the present embodiment, the imaging means 110 may be removed from the collation system 100 illustrated in FIG. 17.

That is, an information processing apparatus 200 of the present embodiment includes a collation means 210 for performing a collation process on a captured image of a pre-passage side area with respect to each of gates installed in parallel with each other.

Then, the collation means 210 performs a collation process on the basis of a target in a captured image of a given gate and a target in a captured image corresponding to another gate.

Note that each of the collation means 120 and 210 may be constructed by execution of a program by an arithmetic unit, or may be constructed by an electronic circuit.

According to the collation system 100 or the information processing apparatus 200 having the configurations described above, a collation method of performing a collation process on a captured image of a pre-passage side area of each of gates installed in parallel with each other, between a previously registered target and a target in the captured image, is provided.

In such a collation method, the collation process is performed on the basis of a target in a captured image of a given gate and a target in a captured image corresponding to another gate.

According to the collation system 100 or the information processing apparatus 200 described above, a target collation process is performed on the basis of a target in a captured image corresponding to a given gate and a target in a captured image corresponding to another gate. Therefore, even in the case where a target who is about to pass through another gate is shown in a captured image corresponding to the given gate, it is possible to determine that such a target is a target who is about to pass through the other gate. Thereby, such a target can be excluded from the collation process of the given gate. As a result, erroneous recognition of a target who is about to pass through a gate can be suppressed.

<Supplementary Notes>

The whole or part of the exemplary embodiments disclosed above can be described as, but not limited to, the following supplementary notes. Hereinafter, outlines of the configurations of a collation system, an information processing apparatus, a program, and a collation method, according to the present invention, will be described. However, the present invention is not limited to the configurations described below.

(Supplementary Note 1)

A collation system comprising:

imaging means for acquiring a captured image of a pre-passage side area with respect to each of gates arranged in parallel with each other; and collation means for performing a collation process on the captured image of the pre-passage side area for each of the gates, between a previously registered target and a target included in the captured image, wherein the collation means performs the collation process on a basis of a target in the captured image corresponding to one of the gates and a target in the captured image corresponding to another one of the gates.

With the configuration described above, the collation system performs a collation process on a target, on the basis of a target in a captured image corresponding to a given gate and a target in a captured image corresponding to another gate. Therefore, even in the case where a target who is about to pass through another gate is shown in a captured image corresponding to a given gate, it is possible to determine that such a target is a target who is about to pass through the other gate. Thereby, such a target can be excluded from the collation process of the given gate. As a result, erroneous recognition of a target who is about to pass through a gate can be suppressed.

(Supplementary Note 2)

The collation system according to supplementary note 1, wherein the collation means performs the collation process on a basis of a target located in a predetermined area in the captured image corresponding to the one of the gates and the target in the captured image corresponding to the other one of the gates.

(Supplementary Note 3)

The collation system according to supplementary note 2, wherein the collation means performs the collation process on a basis of a target located in a first area of the captured image corresponding to the one of the gates and a target located in a second area of the captured image corresponding to the other one of the gates.

(Supplementary Note 4)

The collation system according to supplementary note 3, wherein when the target located in the first area of the captured image corresponding to the one of the gates is also located in the second area of the captured image corresponding to the other one of the gates, the collation means excludes the target located in the first area of the captured image corresponding to the one of the gates from the collation process.

(Supplementary Note 5)

The collation system according to supplementary note 4, wherein when a target located in an end area in a horizontal direction that is the first area of the captured image corresponding to the one of the gates is also located in a center area in a horizontal direction that is the second area of the captured image corresponding to the other one of the gates, the collation means excludes the target located in the end area in the horizontal direction of the captured image corresponding to the one of the gates from the collation process.

(Supplementary Note 6)

The collation system according to supplementary note 4 or 5, wherein when the target located in the first area of the captured image corresponding to the one of the gates is also located in the second area of the captured image corresponding to the other one of the gates at a timing when the target is located in the first area, the collation means excludes the target located in the first area of the captured image corresponding to the one of the gates from the collation process.

According to the configuration described above, the collation system excludes a target shown in an overlapping manner by comparing a target shown in a predetermined area of the captured image corresponding to the given gate with a target shown in the captured corresponding to the other gate, and performs the collation process only on the target shown individually. In particular, when a target located in an end area (first area) in the horizontal direction of the captured image corresponding to the given gate is also shown in the center area (second area) in the horizontal direction of the captured image corresponding to the other gate, the collation process is not performed on such a target. On the other hand, when a target located in an end area (first area) in the horizontal direction of the captured image corresponding to the given gate is not shown in the center area (second area) in the horizontal direction of the captured image corresponding to the other gate, the collation process is performed on such a target. As a result, when a target is shown in the captured image corresponding to the given gate and in the captured image corresponding to the other gate in an overlapping manner, such a target can be excluded from the collation process. Therefore, erroneous recognition of a target who is about to pass through a gate can be suppressed.

(Supplementary Note 7)

The collation system according to supplementary note 4 or 5, wherein
- when the collation means determines that the target located in the first area of the captured image corresponding to the one of the gates is also located in the second area of the captured image corresponding to the other one of the gates on a basis of a feature amount of the target located in the first area of the captured image corresponding to the one of the gates and a feature amount of the target located in the second area of the captured image corresponding to the other one of the gates, the collation means excludes the target located in the first area of the captured image corresponding to the one of the gates from the collation process.

(Supplementary Note 8)

The collation system according to supplementary note 7, wherein
- when the collation means determines that the target located in the first area of the captured image corresponding to the one of the gates is also located in the second area of the captured image corresponding to the other one of the gates on a basis of a feature amount of a part of a face of a person who is the target located in the first area of the captured image corresponding to the one of the gates and a feature amount of a part of a face of a person who is the target located in the second area of the captured image corresponding to the other one of the gates, the collation means excludes the target located in the first area of the captured image corresponding to the one of the gates from the collation process.

According to the configuration described above, the collation system can determine whether or not the same target is shown in the captured images of the gates in an overlapping manner, by extracting and comparing the feature amounts of the targets in the captured images corresponding to the gates. Then, a target shown in the captured images of the given gate and the other gate in an overlapping manner can be excluded from the collation process, and erroneous recognition of a target who is about to pass through a gate can be suppressed. Moreover, the feature amounts of the targets extracted for determining overlapping of the target can be used for the collation process. This enhances the efficiency of the process.

(Supplementary Note 9)

The collation system according to any of supplementary notes 3 to 8, further comprising
- area setting means for setting the first area of the captured image corresponding to the one of the gates and the second area of the captured image corresponding to the other one of the gates, on a basis of the target in the captured image corresponding to the one of the gates and the target in the captured image corresponding to the other one of the gates acquired at a timing when the target is located in the captured image corresponding to the one of the gates.

(Supplementary Note 10)

The collation system according to supplementary note 9, wherein
- when the target in the captured image corresponding to the one of the gates and the target in the captured image corresponding to the other one of the gates acquired at a timing when the target is located in the captured image corresponding to the one of the gates are identical, the area setting means sets a periphery of a position of the target in the captured image corresponding to the one of the gates as the first area and sets a periphery of a position of the target in the captured image corresponding to the other one of the gates as the second area, on a basis of the position of the target in the captured image corresponding to the one of the gates and the position of the target in the captured image corresponding to the other one of the gates. Then, it is possible to exclude the target shown in an overlapped manner for a given gate and another gate from the collation process, and to suppress erroneous recognition of a target who is about to pass through a gate. Moreover, it is possible to use the feature amounts of the targets extracted for determining overlapping of the target for a collation process. This enhances the efficiency of the process.

According to the configuration described above, the collation system can automatically set overlapping areas between the captured images corresponding to the gates, on the basis of the target in the captured image corresponding to the given gate and the target in the captured image corresponding to the other gate. As a result, it is possible to realize easy use of the collation system, and to suppress erroneous recognition with high accuracy.

(Supplementary Note 11)

An information processing apparatus comprising:
- collation means for performing a collation process on a captured image of a pre-passage side area with respect to each of gates installed in parallel with each other, between a previously registered target and a target in the captured image, wherein
- the collation means performs the collation process on a basis of a target in the captured image corresponding to one of the gates and a target in the captured image corresponding to another one of the gates.

(Supplementary Note 12)

The information processing apparatus according to supplementary note 11, wherein
- the collation means performs the collation process on a basis of a target located in a predetermined area of the captured image corresponding to the one of the gates and the target in the captured image corresponding to the other one of the gates.

(Supplementary Note 13)

A program for causing an information processing apparatus to realize
- collation means for performing a collation process on a captured image of a pre-passage side area with respect to each of gates installed in parallel with each other, between a previously registered target and a target in the captured image, wherein the collation means performs the collation process on a basis of a target in the captured image corresponding to one of the gates and a target in the captured image corresponding to another one of the gates.

(Supplementary Note 14)

The program according to supplementary note 13, wherein the collation means performs the collation process on a basis of a target located in a predetermined area of the captured image corresponding to the one of the gates and the target in the captured image corresponding to the other one of the gates.

(Supplementary Note 15)

A collation method comprising performing a collation process on a captured image of a pre-passage side area with respect to each of gates installed in parallel with each other, between a previously registered target and a target in the captured image, wherein the collation process is performed on a basis of a target in the captured image corresponding to one of the gates and a target in the captured image corresponding to another one of the gates.

(Supplementary Note 16)

The collation method according to supplementary note 15, wherein the collation process is performed on a basis of a target located in a predetermined area of the captured image corresponding to the one of the gates and the target in the captured image corresponding to the other one of the gates.

(Supplementary Note 17)

The collation method according to claim 16, wherein the collation process is performed on a basis of a target located in a first area of the captured image corresponding to the one of the gates and a target located in a second area of the captured image corresponding to the other one of the gates.

(Supplementary Note 18)

The collation method according to claim 17, further comprising setting the first area of the captured image corresponding to the one of the gates and the second area of the captured image corresponding to the other one of the gates, on a basis of the target in the captured image corresponding to the one of the gates and the target in the captured image corresponding to the other one of the gates acquired at a timing when the target is located in the captured image corresponding to the one of the gate, wherein the collation process is performed on a basis of the target located in the first area of the captured image corresponding to the one of the gates and the target located in the second area of the captured image corresponding to the other one of the gates.

It should be noted that the program described above may be stored in a storage device or stored on a computer-readable storage medium. The storage medium is a portable medium such as a flexible disk, an optical disk, a magneto-optical disk, or a semiconductor memory, for example.

While the present invention has been described with reference to the exemplary embodiments described above, the present invention is not limited to the above-described embodiments. The form and details of the present invention can be changed within the scope of the present invention in various manners that can be understood by those skilled in the art.

The present invention is based upon and claims the benefit of priority from Japanese patent application No. 2017-179064, filed on Sep. 19, 2017, the disclosure of which is incorporated herein in its entirety by reference.

REFERENCE SIGNS LIST 10 face authentication system
11 target extraction unit
12 target determination unit
13 collation unit
14 gate control unit
15 area setting unit
16 communication unit
17 collation data storage unit
20 face authentication system
100 collation system
110 imaging means
120 collation means
200 information processing apparatus
210 collation means
C1, C2, C3 imaging device
D1 display device
G1, G2, G3 gate

The invention claimed is:

1. An information processing method performed by a computer of a first system and comprising:

acquiring a first captured image including a pre-passage side area with respect to a first gate at a first lane and a part of the pre-passage side area with respect to a second gate at a second lane adjacent to the first lane, wherein people move through the first lane to advance to the first gate and through the second lane to advance to the second gate;

when a first person is in a first area in the first captured image, of querying a second system that acquires a second captured image whether or not a second person is in a second area in the second captured image that is different from the first area, the second captured image including the pre-passage side area of the second gate at the second lane; and recognizing that the first person located in the first captured image is a advancing toward the first gate, when receiving response from the second system that no person is in the second area in the second captured image.

2. The information processing method according to claim 1, further comprising:

in a case where a person is located in an end area in a horizontal direction in the first captured image, querying the second system; and recognizing that the person located in the first captured image is a person moving toward the first gate, in a case of receiving, from the second system, a response that no person is shown in a center area in the horizontal direction in the second captured image.

3. The information processing method according to claim 1, further comprising:

when a person is located in an end area in a horizontal direction in the first captured image, of querying the second system whether or not a person is shown in a center area in a horizontal direction in the second captured image: and recognizing that the person located in the first captured image is moving toward the first gate, when receiving, from the second system, a response that no person is shown in the center area in the horizontal direction in the second captured image.

4. An information processing device comprising:

at least one memory storing instructions; and at least one processor configured to execute instructions to perform processing comprising:

acquiring a first captured image including a pre-passage side area with respect to a first gate at a first lane and a part of the pre-passage side area with respect to a second gate at a second lane adjacent to the first lane, wherein people move through the first lane to advance to the first gate and through the second lane to advance to the second gate;

when a first person is in a first area in the first captured image, querying a second system that acquires a second captured image whether or not a second person is in a second area in the second captured image that is different from the first area, the second captured including the pre-passage side area of the second gate at the second lane; and recognizing that the first person located in the first captured image is advancing toward the first gate, when receiving a response from the second system that no person is in the second area in the second captured image.

5. The information processing device according to claim 4, wherein the processing further comprises:

when a person is located in an end area in a horizontal direction in the first captured image, querying the second system whether or not a person is shown in a center area in a horizontal direction in the second captured image; and recognizing that the person located in the first captured image is moving toward the first gate, when receiving, from the second system, a response that no person is shown in the center area in the horizontal direction in the second captured image.

6. A non-transitory computer-readable medium storing thereon a program executable by a computer to perform processing comprising:

acquiring a first captured image including a pre-passage side area with respect to a first gate at a first lane and a part of the pre-passage side area with respect to a second gate at a second lane adjacent to the first lane, wherein people move through the first lane to advance to the first gate and through the second lane to advance to the second gate;

when a first person is in a first area in the first captured image, querying a second system that acquires a second captured image whether or not a second person is in a second area in the second captured image that is different from the first area, the second captured including the pre-passage side area of the second gate at the second lane; and recognizing that the first person located in the first captured image is advancing toward the first gate, when receiving a response from the second system that no person is in the second area in the second captured image.

7. The non-transitory computer-readable medium storing thereon the program according to claim 6, wherein the further comprises:

when a person is located in an end area in a horizontal direction in the first captured image, querying the second system whether or not a person is shown in a center area in a horizontal direction in the second captured image; and recognizing that the person located in the first captured image is moving toward the first gate, when receiving, from the second system, a response that no person is shown in the center area in the horizontal direction in the second captured image.

8. The information processing method according to claim 1, wherein the first area in the first captured image and the second area in the second captured image are areas showing images of an overlapping space in a real space.

* * * * *